US 12,415,164 B2

(12) United States Patent
Lawal et al.

(10) Patent No.: US 12,415,164 B2
(45) Date of Patent: *Sep. 16, 2025

(54) AIR GAP DISTILLATION SYSTEM AND HEAT EXCHANGER

(71) Applicant: KING FAHD UNIVERSITY OF PETROLEUM AND MINERALS, Dhahran (SA)

(72) Inventors: Dahiru Umar Lawal, Dhahran (SA); Wail Sulaiman Fallatah, Dhahran (SA); Isam Hasan Aljundi, Dhahran (SA); Mohamed Abdelkarim Antar, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/184,902

(22) Filed: Apr. 21, 2025

(65) Prior Publication Data

US 2025/0256245 A1    Aug. 14, 2025

Related U.S. Application Data

(63) Continuation of application No. 17/946,543, filed on Sep. 16, 2022, now Pat. No. 12,303,837.

(51) Int. Cl.
*B01D 61/36*      (2006.01)
*B01D 63/08*      (2006.01)
(Continued)

(52) U.S. Cl.
CPC ......... *B01D 61/366* (2013.01); *B01D 61/364* (2013.01); *B01D 61/3641* (2022.08);
(Continued)

(58) Field of Classification Search
CPC .......... B01D 61/366; B01D 2311/1031; B01D 2311/106
See application file for complete search history.

(56) References Cited

U.S. PATENT DOCUMENTS 11,345,619 B1     5/2022   Lawal et al.
2015/0090647 A1   4/2015   Duke
(Continued)

FOREIGN PATENT DOCUMENTS

CN      209155546 U       7/2019
WO      2016/186308 A1    11/2016
(Continued)

OTHER PUBLICATIONS

Hu, et al. ; Study of the Performance of a Thermoelectric Refrigeration Membrane Cold Chamber Distillation Component ; Frontiers in Energy Research, vol. 10 ; Feb. 2022 ; 9 Pages.
(Continued)

*Primary Examiner* — Bradley R Spies
(74) *Attorney, Agent, or Firm* — Oblon, McClelland, Maier &Neustadt, L.L.P.

(57) ABSTRACT

A distillation apparatus having a hot liquid block, a thermoelectric module (TEM), a condensation surface, a feed liquid chamber having a feed chamber inlet, a feed chamber outlet, and a membrane disposed on at least one side of the feed liquid chamber. One side of the membrane faces to the condensation surface. An air gap of 1 mm to 20 cm separates the condensation surface and the membrane. A permeate outlet in fluid communication with the air gap. A heating unit in fluid communication with the feed liquid chamber and the hot liquid block. A cooling unit in fluid communication with the permeate outlet. A multi-stage distillation apparatus with a plurality of distillation apparatuses. A process of distilling water, by feeding a liquid into the distillation apparatus
(Continued)

through the hot block inlet and collecting distilled water from the permeate outlet.

18 Claims, 15 Drawing Sheets

(51) Int. Cl.
    *B01D 69/02*     (2006.01)
    *C02F 1/44*     (2023.01)
    *C02F 103/08*     (2006.01)

(52) U.S. Cl.
    CPC ............. *B01D 63/08* (2013.01); *B01D 69/02* (2013.01); *C02F 1/447* (2013.01); *B01D 2311/1031* (2022.08); *B01D 2311/106* (2013.01); *B01D 2325/0283* (2022.08); *C02F 2103/08* (2013.01)

(56) References Cited

U.S. PATENT DOCUMENTS

2019/0351347 A1    11/2019    Ant ar
2022/0143553 A1    5/2022    Lawal et al.

FOREIGN PATENT DOCUMENTS

WO    2017/164440 A1    9/2017
WO    2021/105826 A1    6/2021

OTHER PUBLICATIONS

Kim, et al.; Energy efficiency evaluation of a compact direct contact membrane distillation system using thermoelectric modules; Desalination and Water Treatment 201; Oct. 2020; Abstract Only; 1 Page.

AIR GAP DISTILLATION SYSTEM AND HEAT EXCHANGER

CROSS-REFERENCE TO RELATED APPLICATIONS

The present application is a Continuation of U.S. application Ser. No. 17/946,543, now allowed, having a filing date of Sep. 16, 2022.

STATEMENT OF PRIOR DISCLOSURE BY THE INVENTOR

Aspects of the present disclosure are described in D. Lawal; "Thermoelectric Air Gap Membrane Distillation System and Process"; Dec. 19, 2021; King Fahd University of Petroleum & Minerals Mechanical Engineering Department, incorporated herein by reference in its entirety.

BACKGROUND

Technical Field

The present disclosure is directed to membrane distillation, and in particular, to an air gap membrane distillation device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Membrane distillation is a separation process that is driven by phase change. A membrane provides a barrier for a liquid phase while allowing a vapor phase to pass through the membrane. Membrane distillation can be used, for example, in water treatment. Several membrane distillation methods exist. Some examples include direct contact membrane distillation, air gap membrane distillation, vacuum membrane distillation, sweeping gas membrane distillation, vacuum multi-effect membrane distillation, and permeate gap membrane distillation.

Accordingly, it is one object of the present disclosure to provide a membrane distillation apparatus which is able to improve the performance of air gap membrane distillation (AGMD) separation process by not requiring a cooling stream or coolant, thereby reducing manufacturing cost and energy consumption during operation.

SUMMARY

In one or more exemplary embodiments, a distillation apparatus is provided. The apparatus comprises a hot liquid block having a hot block inlet and a hot block outlet. The apparatus further comprises a thermoelectric module (TEM) having a first side and a second side opposite the first side. The hot liquid block is adjacent to the first side of the TEM. The apparatus further comprises a condensation surface having a first side and a second side opposite the first side. The first side of the condensation surface is adjacent to the second side of the TEM. The apparatus further comprises a feed liquid chamber having a feed chamber inlet, a feed chamber outlet, and a membrane disposed on at least one side of the feed liquid chamber. In an exemplary embodiment, one side of the membrane faces to the condensation surface. The apparatus further comprises an air gap of 1-200 mm separates the condensation surface and the membrane. A permeate outlet is in fluid communication with the air gap. The apparatus further comprises a heating unit in fluid communication with the feed liquid chamber and the hot liquid block. The apparatus further comprises a cooling unit in fluid communication with the permeate outlet.

In one or more exemplary embodiments, the heating unit comprises a first heat exchanger, and at least one module selected from the group consisting of (1) a drying unit (DU), a drying unit inlet to DU, and a drying unit outlet of DU, or (2) a space heating unit (SH), a space heating inlet to SH, and a space heating outlet of SH. In one or more exemplary embodiments, the first heat exchanger is fluidly connected to the feed liquid chamber through the feed chamber outlet. In one or more exemplary embodiments, the first heat exchanger is fluidly connected the hot liquid block through the hot block inlet.

In one or more exemplary embodiments, the cooling unit comprises a second heat exchanger, and at least one module selected from the group consisting of a cooling unit (CU) and a space cooling unit, wherein the CU comprises a cooling unit inlet and a cooling unit outlet, and wherein the SC comprises a space cooling inlet and a space cooling outlet. In one or more exemplary embodiments, the second heat exchanger is fluidly connected to the permeate outlet.

In one or more exemplary embodiments, the apparatus further comprises a first TEM and second TEM each having a first side and a second side opposite the first side, wherein the first side of the first TEM is adjacent to the hot liquid block and the second side of the second TEM is adjacent to the condensation surface.

In one or more exemplary embodiments, the membrane is a polytetrafluoroethylene flat sheet.

In one or more exemplary embodiments, the polytetrafluoroethylene flat sheet has a mean pore size between 0.1 μm and 10 μm.

In one or more exemplary embodiments, the air gap includes a rubber support to separate the second side of the condensation surface and the membrane.

In one or more exemplary embodiments, the first heat exchanger is at least one selected from the group consisting of plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

In one or more exemplary embodiments, the second heat exchanger is at least one selected from the group consisting of plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

In one or more embodiments, a multi-stage distillation apparatus comprising a plurality of the distillation apparatuses is provided.

In one or more exemplary embodiments, a first feed liquid chamber in a first stage and a second feed liquid chamber in an adjacent stage are both in fluid communication with a first hot liquid block in the first stage through a first hot block inlet.

In one or more exemplary embodiments, a first hot liquid block in a first stage and a second hot liquid block in an adjacent stage are both in fluid communication with a first feed liquid chamber in the first stage through a first feed chamber inlet.

In one or more exemplary embodiments, a first feed liquid chamber in a first stage and a second feed liquid chamber in an adjacent stage are both in fluid communication with an inlet of a first heat exchanger through feed chamber outlets.

In one or more exemplary embodiments, a first hot liquid block in a first stage and a second hot liquid block in an adjacent stage are both in fluid communication with an outlet of a first heat exchanger through hot block inlets.

In one or more exemplary embodiments, wherein the apparatus further comprises a plurality of thermoelectric modules (TEMs) each having a first side and a second side opposite the first side, wherein and a hot liquid block of a first stage is adjacent to a first side of the first TEM and the second side of the condensation surface of the first stage is adjacent to a second side of a second TEM of the first stage.

In one or more exemplary embodiments, a first air gap in a first stage and a second air gap in an adjacent stage are both in fluid communication with an inlet of a second heat exchanger through air gap outlets.

In one or more exemplary embodiments, a first feed liquid chamber in a first stage and a second feed liquid chamber in an adjacent stage are both in fluid communication with an inlet of a first heat exchanger through feed chamber outlets.
In one or more exemplary embodiments, a first air gap in a first stage and a second air gap in an adjacent stage are both in fluid communication with an inlet of a second heat exchanger through air gap outlets.

In one ore more exemplary embodiments, the TEM is powered by at least one source selected from the group consisting of solar photovoltaic module, wind power mill, geothermal power, ocean/wave mill, or any other form of energy.

In one or more exemplary embodiments, a process of distilling water, comprising feeding a liquid into a distillation apparatus through the hot block inlet and collecting distilled water from the permeate outlet is provided.

In one or more exemplary embodiments, the liquid is at least one selected from the group consisting of salty water, ocean/sea water, rejected brine, wastewater, brackish water, flowback/produced water, fruit juices, blood, milk, dyes, and waste flows.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
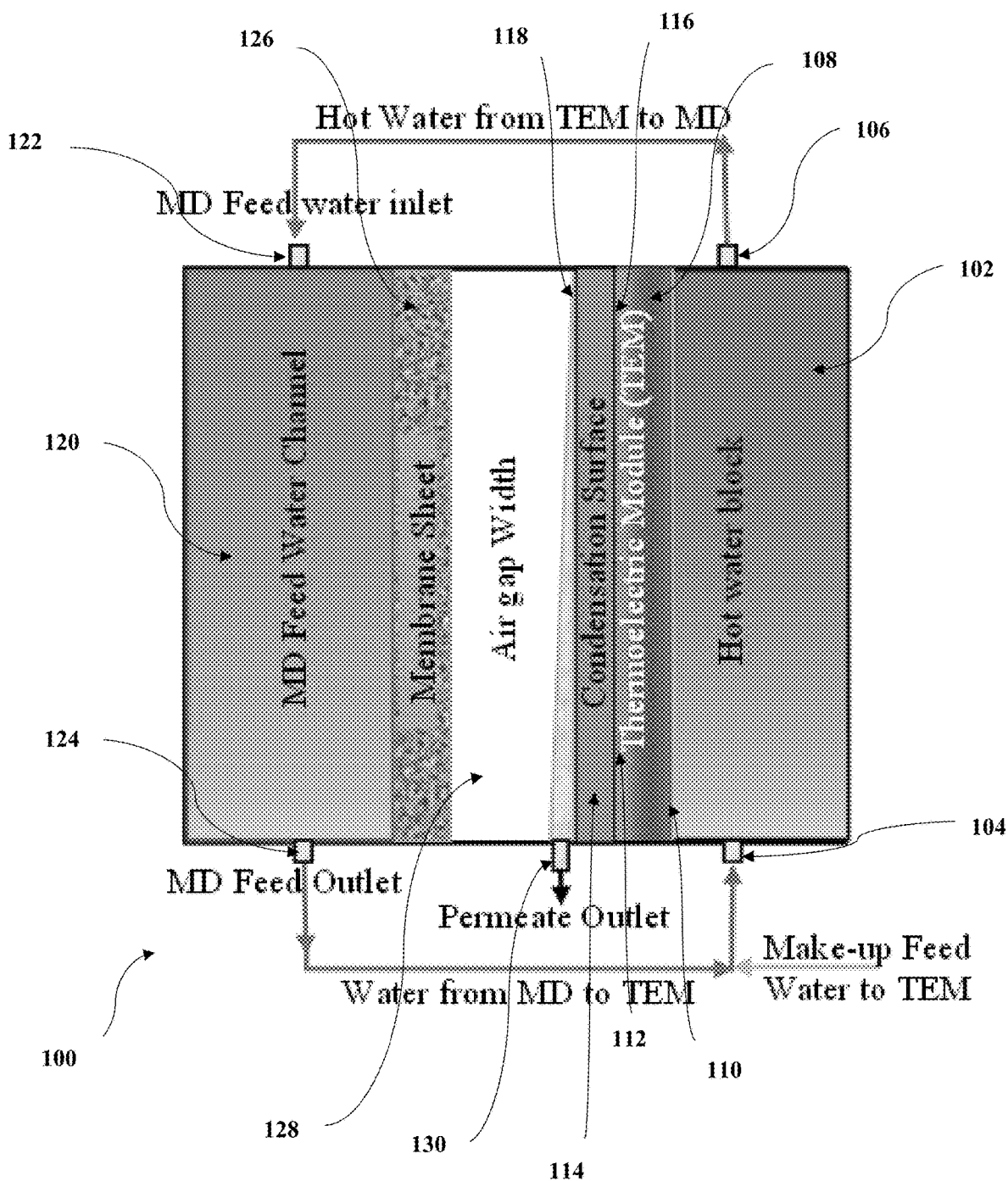
FIG. 1 is a schematic diagram of a single stage to thermoelectric driven air gap membrane distillation (TEM-AGMD) closed-loop apparatus.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Membrane distillation (MD) is a combined thermal and membrane-based separation process which allows vapor permeation across a membrane and prevents liquid penetration. The MD separation process is commonly applied in water desalination by separating water vapor from a brine stream using a micro-porous membrane. The feed stream received by the feed side of the MD is usually warm to encourage evaporation, while the temperature of the coolant stream received by the coolant side of the MD is usually kept lower than that of the feed stream temperature to encourage condensation. The driving force for water vapor permeation across the membrane is the vapor pressure difference. The vapor pressure difference is induced by the temperature gradient across the membrane, Membrane distillation can be performed at a low feed temperature (usually less than 100°

C.) and can be operated by renewable energy and low-grade energy sources, such as solar energy, wind energy, geothermal energy, and waste heat.

The MD module generally exist in four main configurations that include sweeping gas membrane distillation (SGMD), vacuum membrane distillation (VIVID), direct contact membrane distillation (DCMD) and air gap membrane distillation (AGMD). These MD configurations is operated by the same principle (vapor generation, vapor permeation across membrane and vapor condensation). The differences among these configurations lie in the design of their condensation chambers, while the feed side of the modules typically remain the same for all configurations. While the direct contact membrane distillation apparatus yields high permeate flux, it is characterized by high conductive heat loss and high temperature polarization effect. Permeate contamination is possible in DCMD. AGMD is characterized by low conductive heat loss and low temperature polarization effect. However, AGMD yields low permeate flux due to resistance to mass transfer by air in the distillate chamber.

Despite the introduction of innovative designs to MD and advancements in the membrane development, membrane distillation technology is still not commonly used at commercial scales. An objective of the current disclosure is to propose an apparatus in which the heating and cooling demand is provided by thermoelectric module at a commercial scale, rather than pumping a cooling stream or coolant. The subject matter described in this disclosure can be implemented, for example, in desalination, waste treatment, food, and medical applications. The subject matter described in this disclosure can be implemented in particular implementations, so as to realize one or more of the following advantages. The thermoelectric module (TEM) provides heating and cooling to the feed chamber and condensation surface of the membrane distillation module, without the need for a cooling stream or coolant. Further, the TEM-AGMD apparatus and process exhibited fewer number of components and needs no pumping power for coolant stream, which resulted in an apparatus with better energy efficiency, that was more compact, and was less expensive.

FIG. 1 is a schematic diagram of a single stage thermoelectric driven air gap membrane distillation (TEM-AGMD) apparatus 100. The apparatus 100 can be an MD module having a configuration selected from a reinforced hollow tube configuration, a non-reinforced hollow tube configuration, a spiral wound configuration, a flat sheet configuration or non-flat configuration. The apparatus 100 includes a housing (not shown) that protects the components of the apparatus 100 from an external atmosphere. The apparatus 100 includes a hot liquid block 102 with a hot block inlet 104 and a hot block outlet 106. In FIG. 1, the stream to be treated is fluidly connected in closed loop and is recirculated to the hot liquid block 102 immediately. Herein, the term "closed loop" refers to a system in which effluents are recycled, that is, treated and returned for reuse, being an automatic control system operating on a feedback principle. The apparatus 100 includes a thermoelectric module 108 (TEM) with a first side 110 and a second side 112 opposite the first side 110. The hot liquid block 102 is adjacent to the first side 110 of the TEM 108. The apparatus 100 includes a condensation surface 114 having a first side 116 and a second side 118 opposite the first side 116. The first side of the condensation surface 116 is adjacent to the second side 112 of the TEM 108. The apparatus 100 includes a feed liquid chamber 120 having a feed chamber inlet 122, a feed chamber outlet 124, and a membrane 126 disposed on at least one side of the feed liquid chamber 120. One side of the membrane 126 faces to the condensation surface 114, for instance in FIG. 1, the right-most surface of the membrane 126 faces the second side 118 of the condensation surface 114. The apparatus 100 includes an air gap 128 in the range of 1 mm to 20 cm, preferably 2 mm to 5 cm, preferably 4-15 mm, preferably 5-12 mm, preferably 6-9 mm, or 7 mm that separates the condensation surface 114 and the membrane 126. The apparatus 100 includes a permeate outlet 130 that is in fluid communication with the air gap 128. In some implementations, the housing comprises a first end and a second end that is opposite the first end. In some implementations, each of the hot liquid block 102, the TEM 108, the condensation surface 114, the feed liquid chamber 120, the membrane 126, and the air gap 128 span from the first end to the second end.

The hot liquid block 102 includes a hot block inlet 104 and a hot block outlet 106. The hot liquid block 102 is configured to receive a hot liquid stream that includes water. The hot liquid stream can be considered a feed stream. The hot liquid stream can be, for example, seawater, industrial wastewater, brackish water, produced water, fruit juice, blood, milk, dye, harmful waste flow, brine solution, non-condensable gas, non-potable water, or any liquid including dissolved salt, for example, a mixture of salts, a salt and organic contaminant mixture, a salt and inorganic contaminant mixture, or a combination of these. In some embodiments, feeding a liquid into the distillation apparatus 100 can occur through the hot block inlet 104 and can collect distilled liquid from the permeate outlet 130. The hot block inlet 104 is configured to receive a liquid stream returned from the feed liquid chamber 120. In some embodiments, a make-up feed of water is added to the water stream returned from the feed liquid chamber 120. The hot block outlet 106 is configured to discharge the hot liquid stream from the housing. In some embodiments, the hot block outlet 106 discharges the liquid to the feed liquid chamber 120 through a feed chamber inlet 122. In some implementations, the hot block inlet 104 is disposed at the first end of the housing on a top surface. In some implementations, the hot block outlet 106 is disposed at the first end of the housing as well, but on a bottom surface.

The thermoelectric module 108 (TEM) has a first side 110 and a second side 112 opposite the first side 110. The hot liquid block 102 is adjacent to the first side 110 of the TEM 108. The thermoelectric module 108 is any device that either converts heat directly into electricity (by the Seebeck effect) or transforms electrical energy into thermal energy (by the Peltier effect). In some embodiments, the TEM 108 transforms electrical energy into thermal energy by the Peltier effect. In some embodiments, the TEM 108 collects energy from at least one source selected from the group consisting of solar photovoltaic module, wind power mill, geothermal power, and ocean/wave mill. The TEM 108 is configured to convert a colder liquid stream entering the hot liquid block 102 to a warm liquid stream with the converted thermal energy. The first side 110 of the TEM 108 is therefore configured to provide heating for the liquid stream in the hot liquid block 108. The second side 112 is configured to provide cooling for the condensation surface 114.

The condensation surface 114 is configured to condense the liquid vapor (from the hot liquid block 102 that passed through the membrane 126) in the air gap 128 to form a permeate stream. In some implementations, the condensation surface 114 is in the form of a thin, metallic plate or a thin, polymeric plate. In some implementations, the condensation is in the form of thin, metallic tubes or thin, polymeric tubes. The condensation surface 114 can be made, for example, from metallic material, composite material, carbon fibers, carbon nanotubes, or sapphire. In some embodiments, the condensation surface 114 is made of copper. The permeate stream formed in the air gap 128 is discharged from the apparatus 100 via the permeate outlet 130. The permeate stream has a water purity level that is greater than a water purity level of the hot liquid stream. The condensation surface 114 has a first side 116 and a second side 118 opposite the first side 116. The first side of the condensation surface 116 is adjacent to the second side 112 of the TEM 108. The first side 116 is cooled by the second side 112 of the TEM 108.

The feed liquid chamber 120 includes a feed chamber inlet 122 and a feed chamber outlet 124. The feed chamber inlet 122 is configured to receive a cold medium stream. The cold liquid stream can be considered a coolant. The cold liquid stream can be, for example, the hot medium liquid after the hot liquid stream exits the hot block outlet 106 and has been cooled for use as a coolant. In some implementations, the cold liquid stream includes water, air, oil, or a combination of these. In some implementations, the cold liquid stream includes a fluid other than water, air, or oil. The feed chamber outlet 124 is configured to return the cold liquid stream to the hot liquid block 102 through the hot block inlet 104. In some implementations, the feed chamber inlet 122 is disposed at the second end of the housing, on a top surface. In some implementations, the feed chamber outlet 124 is disposed at the second end of the housing as well, but at a bottom surface. Having the hot block outlet 106 and the feed chamber inlet 122 at opposing ends of the housing and the hot medium inlet 104 and the feed chamber outlet 124 at opposing ends of the housing allows for the hot liquid stream and the cold liquid stream 152 to flow in a counter-current manner through the housing, which can improve heat transfer within the housing. In some implementations, the hot liquid stream and the cold liquid stream flow in a concurrent flow manner through the housing. In some implementations, the hot liquid stream and the cold liquid stream flow in a cross-flow manner through the housing.

The membrane 126 defines multiple pores that are sized to allow water vapor originating from the hot liquid stream to pass from the hot liquid block 102 through the membrane 126 to the air gap compartment 128. The membrane 126 is configured to prevent liquid from passing through the membrane 126. The membrane 126 can be, for example, a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane. In some embodiments, the membrane 126 is a polytetrafluoroethylene flat sheet. In some embodiments, the polytetrafluoroethylene flat sheet membrane 126 has a mean pore size between 10 nm and 10 μm, preferably between 50 nm to 5 μm, 0.1 to 1 μm, 0.2 to 0.75 μm, 0.25 to 0.5 μm, meanwhile, the upper or lower endpoints may be any of the prior or at least 25, 75, 125, 175, 225, 275, 300, 325, 350, 375, or 400 nm, and/or at most 25, 20, 15, 7.5, 2.5, 1.25, 0.9, 0.8, 0.75, 0.7, or 0.6 μm. In some implementations, the membrane 126 includes a support layer and an active layer. In some embodiments, the polytetrafluoroethylene flat sheet membrane 126 has an effective area in the range of 0.005 to 5 m$^2$, preferably between 0.1 to 4 m$^2$, preferably between 0.5 to 3 m$^2$, preferably between 1 to 2 m$^2$. In some other embodiments, the effective surface area of the hydrophobic membrane 126 is less than 0.005 m$^2$, preferably between 0.001 to 0.05 m$^2$, preferably between 0.005 to 0.01 m$^2$, preferably about 0.007 m$^2$. The membrane 126 can be made, for example, from a porous material. In some implementations, a contact angle of a droplet of the hot liquid stream on the membrane 126 is greater than 90 degrees (°).

The air gap 128 includes a permeate outlet 130. The air gap 128 is substantially filled with air. In some implementations, the air filling the air gap 128 is humidified air. In some implementations, the width of the air gap 128 is in a range of from 1 millimeter (mm) to 200 mm, preferably between 25 mm and 175 mm, preferably between 50 mm and 150 mm, preferably between 75 mm and 125 mm, or 100 mm. In some implementations, the air gap 128 is a fixed gap compartment. For example, the width of the air gap 128 between the membrane 126 and the condensation surface 114 is uniform from the first end to the second end of the housing. In some implementations, the air gap 128 is a variable gap compartment. For example, the width of the air gap 128 between the membrane 126 and the condensation surface 114 is non-uniform from the first end to the second end of the housing. For example, the condensation surface 114 can be disposed at an angle deviating from the vertical, such that the width of the air gap 128 between the membrane 126 and the condensation surface gradually increases from the first end to the second end of the housing. In some embodiments, the air gap 128 includes a rubber support to separate the second side 118 of the condensation surface 114 and the membrane 126. In some embodiments, the rubber support is fabricated of EDPM, neoprene, silicone rubber, nitriles, vinyls, silicones, or a combination of the like.

The hot liquid block 102, the air gap 128, the condensation surface 114, TEM 108, and the feed liquid chamber 120 of the apparatus 100 may be of any shape, such as rectangular, triangular, square, circular, cylindrical, hexagonal, or spherical. The housing can be made, for example, from metallic material, polymeric material, composite material, carbon fiber, carbon nanotube, or sapphire. In some implementations, the housing is made of steel, brass, copper, high density polyethylene (HDPE), acrylic, or polyvinyl chloride (PVC).

The apparatus 100 operates with a liquid feed stream to be treated that enters the hot liquid block 102 attached to the first side 110 of the TEM 108. In some embodiments, the liquid feed stream is fixed and ranges between 0.1 liter/minute (L/min) and 1000 L/min, preferably between 0.5 L/min and 50 L/min, preferably between 5 L/min and 45 L/min, preferably between 10 L/min and 40 L/min, preferably between 15 L/min and 35 L/min, preferably between 20 L/min and 30 L/min, or 25 L/min. The liquid feed stream gets heated up in the hot liquid block 102 and exits the hot liquid block to the feed liquid chamber 120 at an elevated temperature. As the hot liquid stream passes over the surface of the membrane 126 in the feed liquid chamber 120, vapor and a permeate is generated across the membrane pores. The permeated vapor through the membrane 126 travels across the air gap 128 and condenses into distillate/permeate upon contact with the cold condensation surface 114. The condensation surface 114 is kept cold by the second side 112 of the TEM 108. Therefore, the second side 112 of the TEM 108 provides heating to the liquid feed stream, while the first side 110 of the TEM 108 simultaneously provides cooling to the condensation surface 114 for effective vapor condensation and distillate production. In some cases, the liquid feed stream exiting the feed liquid chamber 120 is immediately recirculated to the hot liquid block 102 for reheating. In other cases, the liquid feed stream exiting the feed liquid chamber 120 carries thermal energy and exchanges heat with another stream for space conditioning or drying purposes. For the drying, the liquid feed stream is recircled to the hot liquid block 102 for reheating after exchanging heat with the drying or space conditioning stream. Also, in some cases, the distillate exits the air gap 128 at ambient temperature through the permeate outlet 130, and in other cases, the distillate exits the air gap 128 at very low temperatures relative to ambient temperature.

Figure 2:
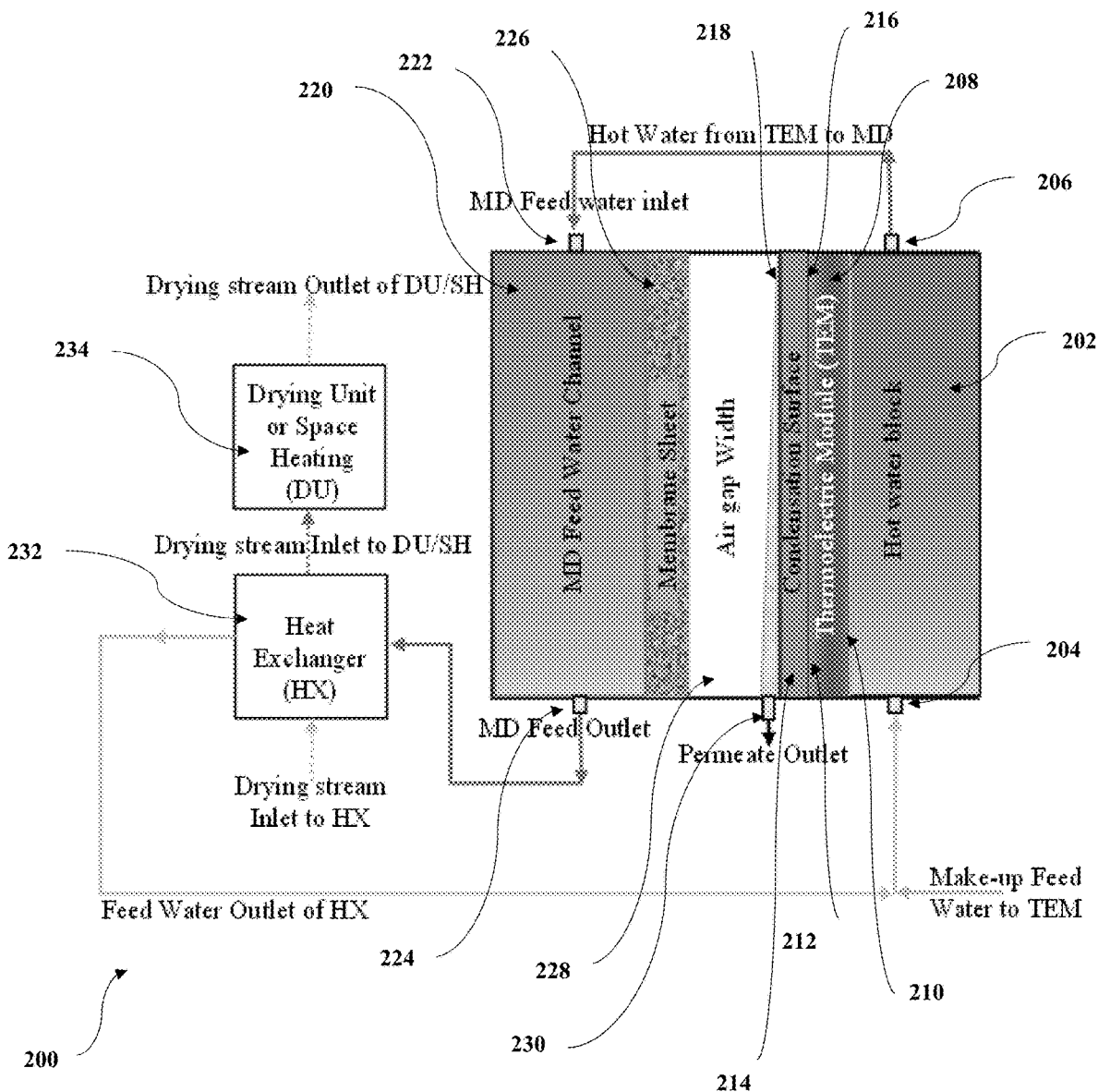
FIG. 2 is a schematic diagram of a single stage TEM-AGMD closed/open-loop apparatus with a heating application apparatus, according to certain embodiments.

FIG. 2 is a schematic diagram of a single stage thermoelectric driven air gap membrane distillation (TEM-AGMD) apparatus 200 with a heating unit. The apparatus 200 can be an MD module having a configuration selected from a reinforced hollow tube configuration, a non-reinforced hollow tube configuration, a spiral wound configuration, a flat sheet configuration or non-flat configuration. The apparatus 200 includes a housing (not shown) that protects the components of the apparatus 200 from an external atmosphere. The apparatus 200 includes a hot liquid block 202 with a hot block inlet 204 and a hot block outlet 206. In FIG. 2, the stream to be treated is fluidically connected to the hot liquid block 202 in either a closed or open loop. Herein, the term "open loop" refers to a control system in which an input alters the output, but the output has no feedback loop and therefore no effect on the input. The apparatus 200 includes a thermoelectric module 208 (TEM) with a first side 210 and a second side 212 opposite the first side 210. The hot liquid block 202 is adjacent to the first side 210 of the TEM 208. The apparatus 200 includes a condensation surface 214 having a first side 216 and a second side 218 opposite the first side 216. The first side of the condensation surface 216 is adjacent to the second side 212 of the TEM 208. The apparatus 200 includes a feed liquid chamber 220 having a feed chamber inlet 222, a feed chamber outlet 224, and a membrane 226 disposed on at least one side of the feed liquid chamber 220. One side of the membrane 226 faces to the condensation surface 214, for instance in FIG. 2, the right-most surface of the membrane 226 faces the second side 218 of the condensation surface 214. The apparatus 200 includes an air gap 228 in the range of 1 mm to 20 cm, preferably 2 mm to 5 cm, preferably 4-15 mm, preferably 5-12 mm, preferably 6-9 mm, or 7 mm that separates the condensation surface 214 and the membrane 226. The apparatus 100 includes a permeate outlet 230 that is in fluid communication with the air gap 228. In some implementations, the housing comprises a first end and a second end that is opposite the first end. In some implementations, each of the hot liquid block 202, the TEM 208, the condensation surface 214, the feed liquid chamber 220, the membrane 226, and the air gap 228 span from the first end to the second end. The apparatus 200 includes a first heat exchanger 232 and a drying unit (DU) 234, which define a heating unit. The heating unit in fluid communication with the feed liquid chamber 220 and the hot liquid block 202.

In some implementations, the apparatus 200 includes a heating unit defined by the first heat exchanger 232 in fluid communication with the feed liquid chamber 220 and the membrane 226 and a drying unit 234. In some embodiments, the heating unit comprises a first heat exchanger 232, and at least one module selected from the group consisting of a drying unit (DU) 234, a drying unit inlet to DU, and a drying unit outlet of DU, or a space heating unit (SH), a space heating inlet to SH, and a space heating outlet of SH. In some embodiments, the first heat exchanger 232 is fluidly connected to the feed liquid chamber 220 through the feed chamber outlet 224. In some embodiments, the first heat exchanger 232 is fluidly connected the hot liquid block 202 through the hot block inlet 204. In such implementations, the first heat exchanger 232 can be configured to heat the hot liquid stream before the hot liquid stream is received by the hot block inlet 204. The first heat exchanger 232 can utilize, for example, renewable energy, low-enthalpy geothermal energy, industrial waste heat, low or high-grade energy sources, an electric source, low-grade steam from nuclear power plants, heat from any thermal plants such as diesel engines, power plants, desalination plants, or a combination of these to heat the hot liquid stream. In some embodiments, the first heat exchanger 232 is at least one selected from the group consisting of plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger. In some implementations, the hot liquid stream is pressurized before being received by the hot block inlet 204. In some cases, pressurizing the hot liquid stream can also result in increasing the temperature of the hot liquid stream. In some embodiments, the drying unit 234 may be embodied as, but not limited to, an electrical heater, a solar heater, resistive heating wires, resistive heating coils, visible or infrared heater or a hot water heat exchanger.

In apparatus 200, the warm liquid feed stream exiting the feed chamber 220 passes through the first heat exchanger 232 where it exchanges heat with stream entering the drying unit or conditioning space 234 before it is recirculated back to the hot liquid block 202 for reheating. A make-up feed stream is added to replenish the lost liquid feed stream in the feed liquid chamber 220 in the form of vapor.

Figure 3:
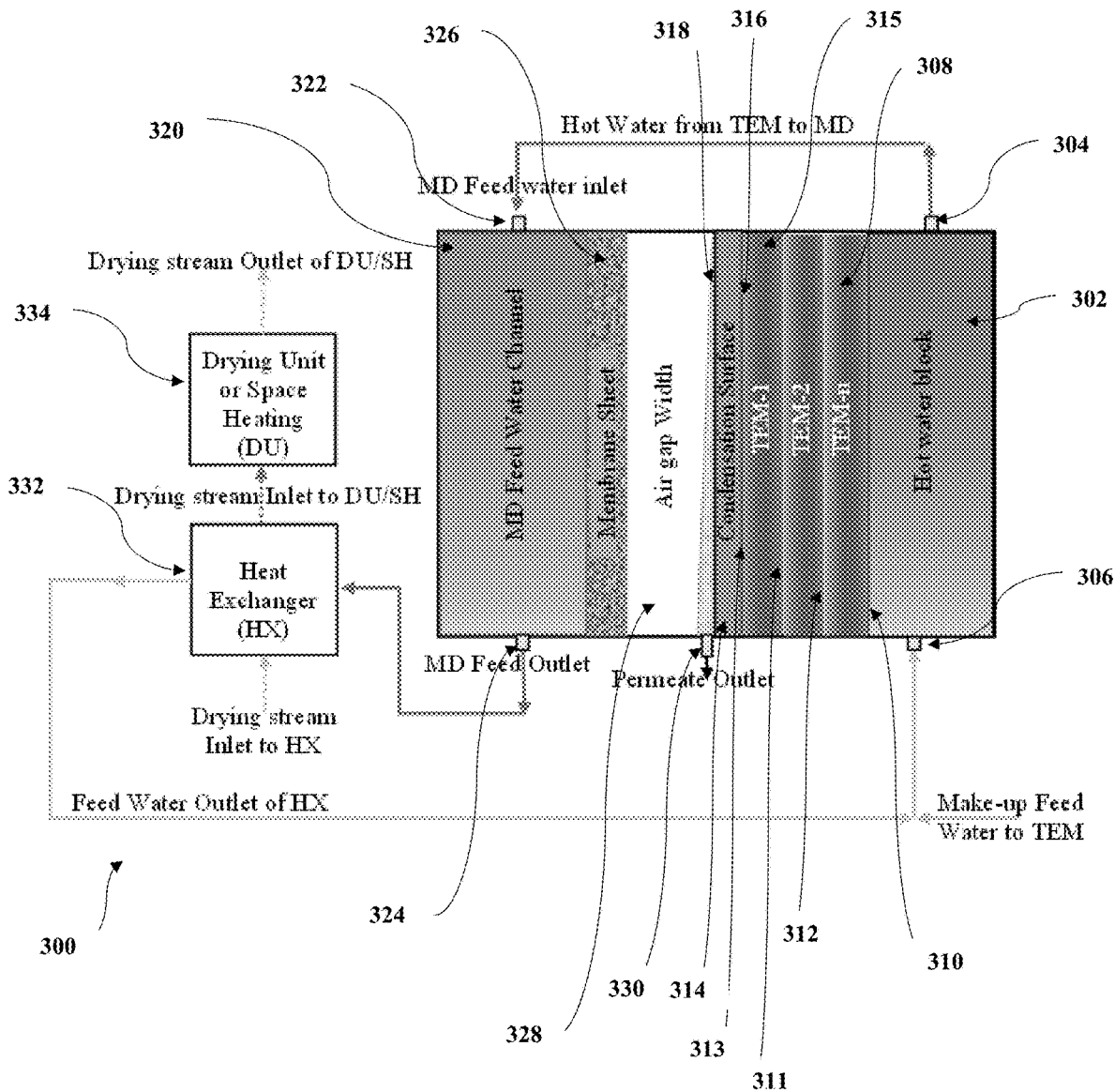
FIG. 3 is a schematic diagram of a single stage TEM-AGMD closed/open-loop apparatus with multiple thermoelectric modules (TEM) and a heating application apparatus, according to certain embodiments.

FIG. 3 is a schematic diagram of a single stage thermoelectric driven air gap membrane distillation (TEM-AGMD) apparatus 300 with multiple thermoelectric modules (TEM) and a heating application apparatus. The apparatus 300 can be an MD module having a configuration selected from a reinforced hollow tube configuration, a non-reinforced hollow tube configuration, a spiral wound configuration, a flat sheet configuration or non-flat configuration. The apparatus 300 includes a housing (not shown) that protects the components of the apparatus 300 from an external atmosphere. The apparatus 300 includes a hot liquid block 302 with a hot block inlet 304 and a hot block outlet 306. In FIG. 3, the stream to be treated is fluidically connected to the hot liquid block 302 in either a closed or open loop. The apparatus 300 includes a first thermoelectric module 308 (TEM) with a first side 310 and a second side 312 opposite the first side 310. The hot liquid block 302 is adjacent to the first side 310 of the first TEM 308. The apparatus 300 includes a second thermoelectric module 315 (TEM) with a first side 311 and a second side 313 opposite the first side 311. The hot liquid block 302 is adjacent to the second side 313 of the second TEM 315. The apparatus 300 includes a condensation surface 314 having a first side 316 and a second side 318 opposite the first side 316. The first side of the condensation surface 316 is adjacent to the second side 313 of the second TEM 315. The apparatus 300 includes a feed liquid chamber 320 having a feed chamber inlet 322, a feed chamber outlet 324, and a membrane 326 disposed on at least one side of the feed liquid chamber 320. One side of the membrane 326 faces to the condensation surface 314, for instance in FIG. 3, the right-most surface of the membrane 326 faces the second side 318 of the condensation surface 314. The apparatus 300 includes an air gap 328 in the range of 1 mm to 20 cm, preferably 2 mm to 5 cm, preferably 4-15 mm, preferably 5-12 mm, preferably 6-9 mm, or 7 mm that separates the condensation surface 314 and the membrane 326. The apparatus 300 includes a permeate outlet 330 that is in fluid communication with the air gap 328. In some implementations, the housing comprises a first end and a second end that is opposite the first end. In some implementations, each of the hot liquid block 302, the TEM 308, the condensation surface 314, the feed liquid chamber 320, the membrane 326, and the air gap 328 span from the first end to the second end. The apparatus 300 includes a first heat exchanger 332 and a drying unit (DU) 334, which define a heating unit. The heating unit in fluid communication with the feed liquid chamber 320 and the hot liquid block 302.

In some embodiments, the apparatus further comprises a first TEM 308 and second TEM 315 each having a first side and a second side opposite the first side, wherein the first side 310 of the first TEM 310 is adjacent to the hot liquid block 302 and the second side 313 of the second TEM 315 is adjacent to the condensation surface 314. In some embodiments, the apparatus 300 has between 2 and 16 TEMs, preferably between 4 and 14 TEMs, preferably between 6 and 12 TEMS, preferably between 8 and 10 TEMs, or 9 TEMs. The maximum number of stages depends on the difference between the liquid feed stream temperature and condensation surface 314 temperature of the final stage, which must be maintained between 10° C. and 20° C., preferably between 11° C. and 19° C., preferably between 12° C. and 18° C., preferably between 13° C. and 17° C., preferably between 14° C. and 16° C., or 15° C. In some embodiments, the first TEM 308 and second TEM 315 are powered by solar voltaic cells. In some embodiments, the number of TEMs used in apparatus 300 is six. In some embodiments, the six TEMs in apparatus 300 range from 20 W of power to 600 W, preferably between 100 W and 250 W, preferably between 150 W and 200 W, or 175 W. In some embodiments, the number of TEMs used in apparatus 300 may be less or more than six. In some embodiments, there may be exactly one hot liquid block 302 for each TEM 308.

In apparatus 300, warm liquid feed stream exiting the feed liquid chamber 320 passes through the first heat exchanger 332 where it exchanges heat with a stream entering the drying unit or conditioning space 334 before it is recirculated back to the hot liquid block 302 for reheating. A make-up feed stream is added to replenish the lost liquid feed stream in the feed liquid chamber 320 in the form of vapor.

Figure 4:
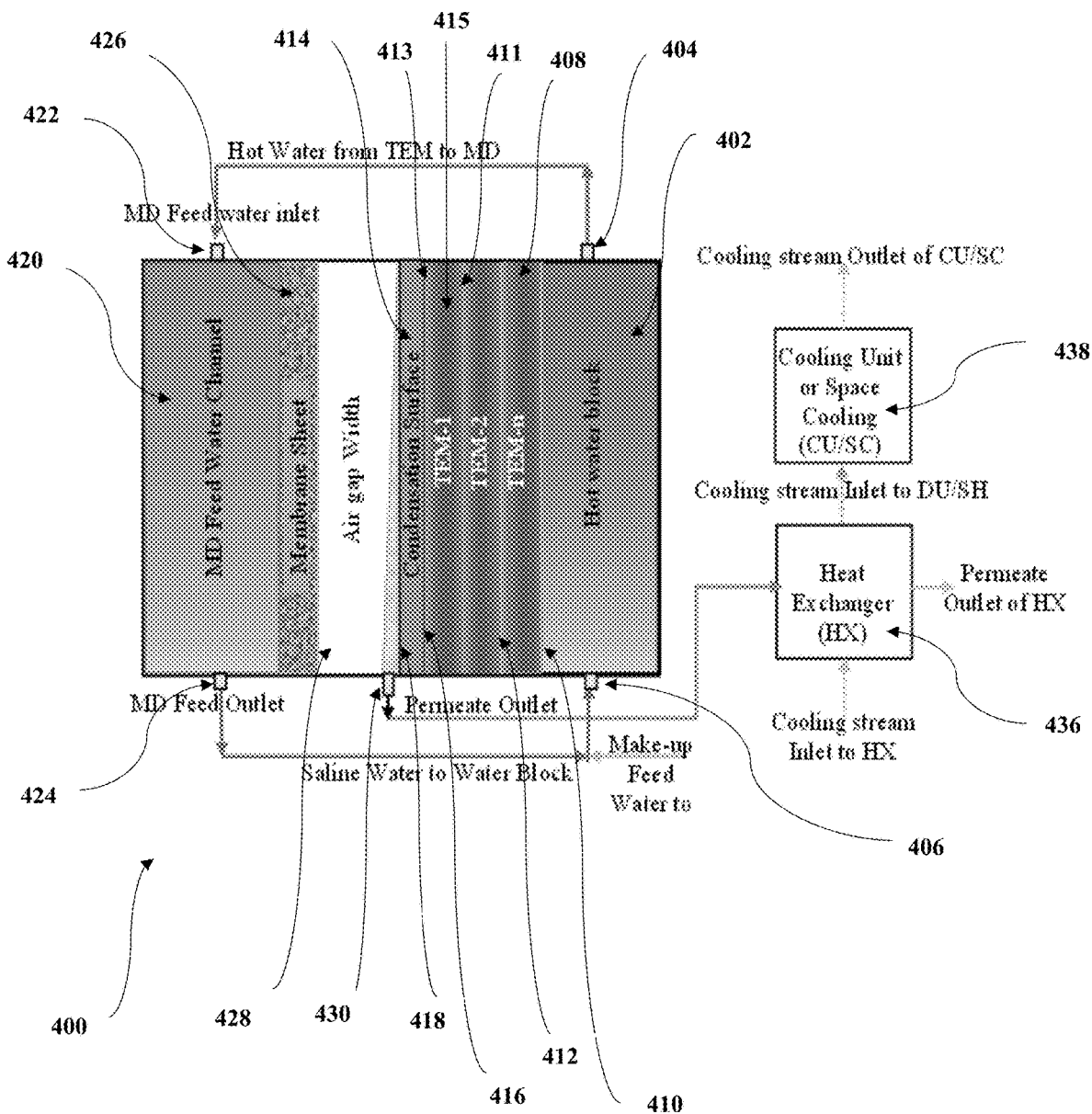
FIG. 4 is a schematic diagram of a single stage TEM-AGMD closed-loop apparatus with multiple TEMs and a cooling application apparatus, according to certain embodiments.

FIG. 4 is a schematic diagram of a single stage thermoelectric driven air gap membrane distillation (TEM-AGMD) apparatus 400 with multiple thermoelectric modules (TEM) and a cooling application apparatus. The apparatus 400 can be an MD module having a configuration selected from a reinforced hollow tube configuration, a non-reinforced hollow tube configuration, a spiral wound configuration, a flat sheet configuration or non-flat configuration. The apparatus 400 includes a housing (not shown) that protects the components of the apparatus 400 from an external atmosphere. The apparatus 400 includes a hot liquid block 402 with a hot block inlet 404 and a hot block outlet 406. In FIG. 4, the stream to be treated is fluidly connected in closed loop and is recirculated to the hot liquid block 402 immediately for reheating. The apparatus 400 includes a first thermoelectric module 408 (TEM) with a first side 410 and a second side 412 opposite the first side 410. The hot liquid block 402 is adjacent to the first side 410 of the first TEM 408. The apparatus 400 includes a second thermoelectric module 415 (TEM) with a first side 411 and a second side 413 opposite the first side 411. The hot liquid block 402 is adjacent to the second side 413 of the second TEM 415. The apparatus 400 includes a condensation surface 414 having a first side 416 and a second side 418 opposite the first side 416. The first side of the condensation surface 416 is adjacent to the second side 413 of the second TEM 415. The apparatus 400 includes a feed liquid chamber 420 having a feed chamber inlet 422, a feed chamber outlet 424, and a membrane 426 disposed on at least one side of the feed liquid chamber 420. One side of the membrane 426 faces to the condensation surface 414, for instance in FIG. 4, the right-most surface of the membrane 426 faces the second side 418 of the condensation surface 414. The apparatus 400 includes an in the range of 1 mm to 20 cm, preferably 2 mm to 5 cm, preferably 4-15 mm, preferably 5-12 mm, preferably 6-9 mm, or 7 mm that separates the condensation surface 414 and the membrane 426. The apparatus 400 includes a permeate outlet 430 that is in fluid communication with the air gap 428. In some implementations, the housing comprises a first end and a second end that is opposite the first end. In some implementations, each of the hot liquid block 402, the TEM 408, the condensation surface 414, the feed liquid chamber 420, the membrane 426, and the air gap 428 span from the first end to the second end. The apparatus 400 includes a second heat exchanger 436 and a space cooler 438, which define the cooling unit.

In some embodiments, the cooling unit in fluid communication with the permeate outlet 430. In some embodiments, the cooling unit comprises a second heat exchanger 436, and at least one module selected from the group consisting of a cooling unit (CU) and a space cooling unit 438, wherein the CU comprises a cooling unit inlet and a cooling unit outlet, and wherein the SC comprises a space cooling inlet and a space cooling outlet. The second heat exchanger 436 is fluidly connected to the permeate outlet 430. In some embodiments, the second heat exchanger 436 is at least one selected from the group consisting of plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger. In some implementations, the apparatus 400 includes a second heat exchanger 436 in fluid communication with the air gap 428 through the permeate outlet 430 and the condensation surface 414. In such implementations, the second heat exchanger 436 can be configured to cool the cold liquid stream before the cold liquid stream is received by the feed chamber inlet 422. In some embodiments, the space cooler 438 may be embodied as, but not limited to, an electrical cooler, a solar cooler, resistive cooling wires, resistive cooling coils, visible or infrared cooler or a cold-water heat exchanger. The cold permeate stream exiting the air gap 428 passes through the second heat exchanger 436 where it exchanges heat with stream entering the cooling unit or conditioning space 438. A make-up feed stream is added to replenish the lost feed stream in the feed liquid chamber 420 in the form of vapor.

Figure 5:
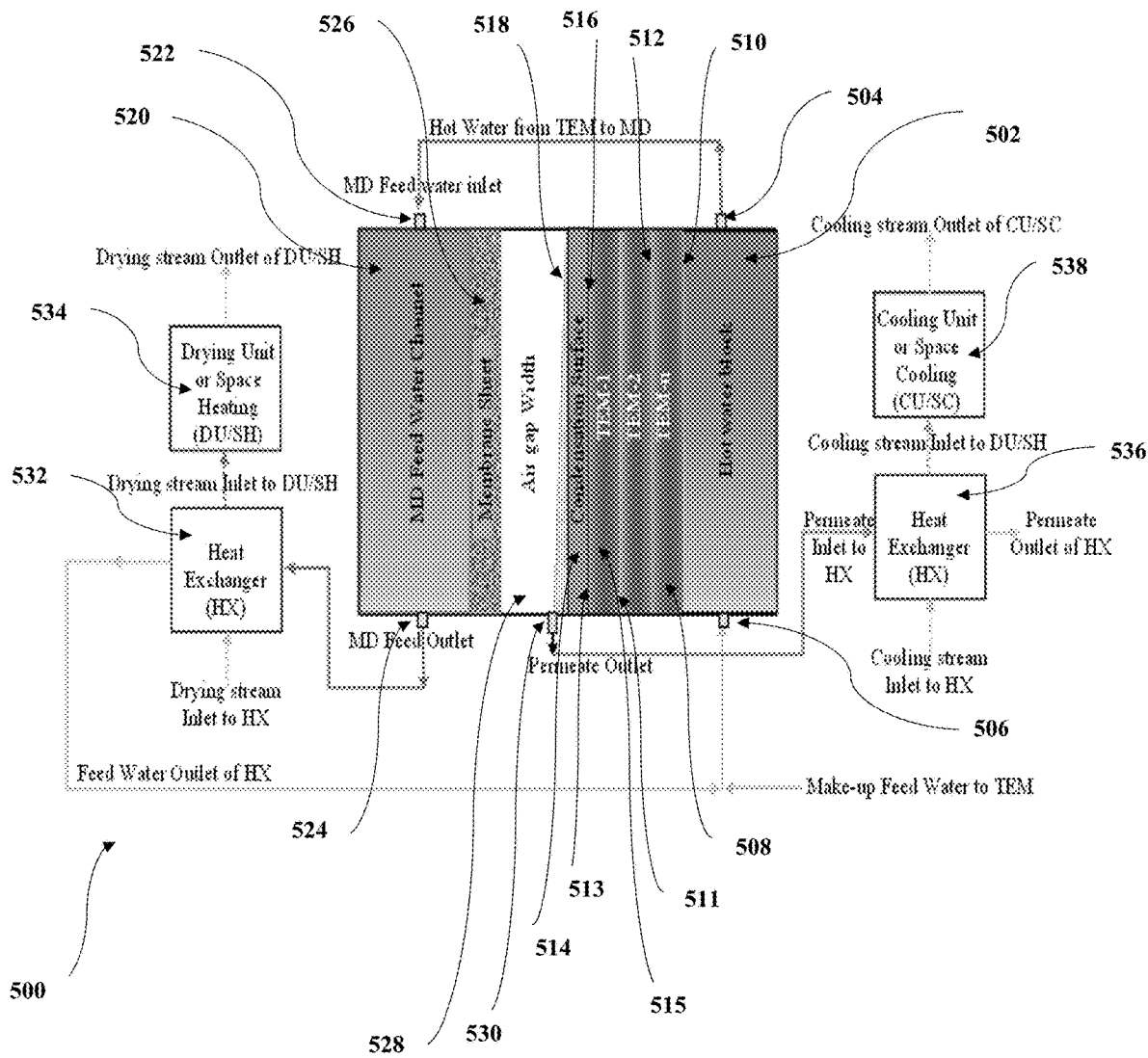
FIG. 5 is a schematic diagram of a single stage TEM-AGMD closed/open-loop apparatus with multiple TEMs with a cooling and a heating application apparatus, according to certain embodiments.

FIG. 5 is a schematic diagram of a single stage thermoelectric driven air gap membrane distillation (TEM-AGMD) apparatus 500 with multiple thermoelectric modules (TEM), a heating application apparatus, and a cooling application apparatus. The apparatus 500 can be an MD module having a configuration selected from a reinforced hollow tube configuration, a non-reinforced hollow tube configuration, a spiral wound configuration, a flat sheet configuration or non-flat configuration. The apparatus 500 includes a housing (not shown) that protects the components of the apparatus 500 from an external atmosphere. The apparatus 500 includes a hot liquid block 502 with a hot block inlet 506 and a hot block outlet 504. In FIG. 5, the stream to be treated is fluidically connected to the hot liquid block 502 in either a closed or open loop. The apparatus 500 includes a first thermoelectric module 508 (TEM) with a first side 510 and a second side 512 opposite the first side 510. The hot liquid block 502 is adjacent to the first side 510 of the first TEM 508. The apparatus 500 includes a second thermoelectric module 515 (TEM) with a first side 511 and a second side 513 opposite the first side 511. The hot liquid block 502 is adjacent to the second side 513 of the second TEM 515. The apparatus 500 includes a condensation surface 514 having a first side 516 and a second side 518 opposite the first side 516. The first side of the condensation surface 516 is adjacent to the second side 513 of the second TEM 515. The apparatus 500 includes a feed liquid chamber 520 having a feed chamber inlet 522, a feed chamber outlet 524, and a membrane 526 disposed on at least one side of the feed liquid chamber 520. One side of the membrane 526 faces to the condensation surface 514, for instance in FIG. 5, the right-most surface of the membrane 526 faces the second side 518 of the condensation surface 514. The apparatus 500 includes in the range of 1 mm to 20 cm, preferably 2 mm to 5 cm, preferably 4-15 mm, preferably 5-12 mm, preferably 6-9 mm, or 7 mm that separates the condensation surface 514 and the membrane 526. The apparatus 500 includes a permeate outlet 530 that is in fluid communication with the air gap 528. In some implementations, the housing comprises a first end and a second end that is opposite the first end. In some implementations, each of the hot liquid block 502, the TEM 508, the condensation surface 514, the feed liquid chamber 520, the membrane 526, and the air gap 528 span from the first end to the second end. The apparatus 500 includes a first heat exchanger 532 and a drying unit (DU) 534, which define a heating unit. The heating unit in fluid communication with the feed liquid chamber 520 and the hot liquid block 502. The apparatus 500 includes a second heat exchanger 536 and a space cooler 538, which define the cooling unit.

In some implementations, the apparatus 500 includes a heating unit defined by the first heat exchanger 532 in fluid communication with the feed liquid chamber 520 and the membrane 526 and a drying unit 534. In some embodiments, the heating unit comprises a first heat exchanger 532, and at least one module selected from the group consisting of a drying unit (DU) 34, a drying unit inlet to DU, and a drying unit outlet of DU, or a space heating unit (SH), a space heating inlet to SH, and a space heating outlet of SH. In some embodiments, the first heat exchanger 532 is fluidly connected to the feed liquid chamber 520 through the feed chamber outlet 524. In some embodiments, the first heat exchanger 532 is fluidly connected the hot liquid block 502 through the hot block inlet 504. In some embodiments, the drying unit 534 may be embodied as, but not limited to, an electrical heater, a solar heater, resistive heating wires, resistive heating coils, visible or infrared heater or a hot water heat exchanger.

In some embodiments, the cooling unit in fluid communication with the permeate outlet 530. In some embodiments, the cooling unit comprises a second heat exchanger 536, and at least one module selected from the group consisting of a cooling unit (CU) and a space cooling unit 538, wherein the CU comprises a cooling unit inlet and a cooling unit outlet, and wherein the SC comprises a space cooling inlet and a space cooling outlet. The second heat exchanger 536 is fluidly connected to the permeate outlet 530. In some implementations, the apparatus 500 includes a second heat exchanger 536 in fluid communication with the air gap 528 through the permeate outlet 530 and the condensation surface 514. In such implementations, the second heat exchanger 536 can be configured to cool the cold liquid stream before the cold liquid stream is received by the feed chamber inlet 522. In some embodiments, the space cooler 538 may be embodied as, but not limited to, an electrical cooler, a solar cooler, resistive cooling wires, resistive cooling coils, visible or infrared cooler or a cold-water heat exchanger.

The warm feed stream exiting the feed liquid chamber 520 passes through the first heat exchanger 532 where it exchanges heat with the stream entering the drying unit or conditioning space 534 before it is recirculated back to the hot liquid block 502 for reheating. Whereas the cold permeate stream exiting the air gap 528 passes through the second heat exchanger 536 where it exchanges heat with stream entering the cooling unit or conditioning space 538. A make-up feed stream is added to replenish the lost feed stream in the feed liquid chamber 520 in the form of vapor.

Figure 6:
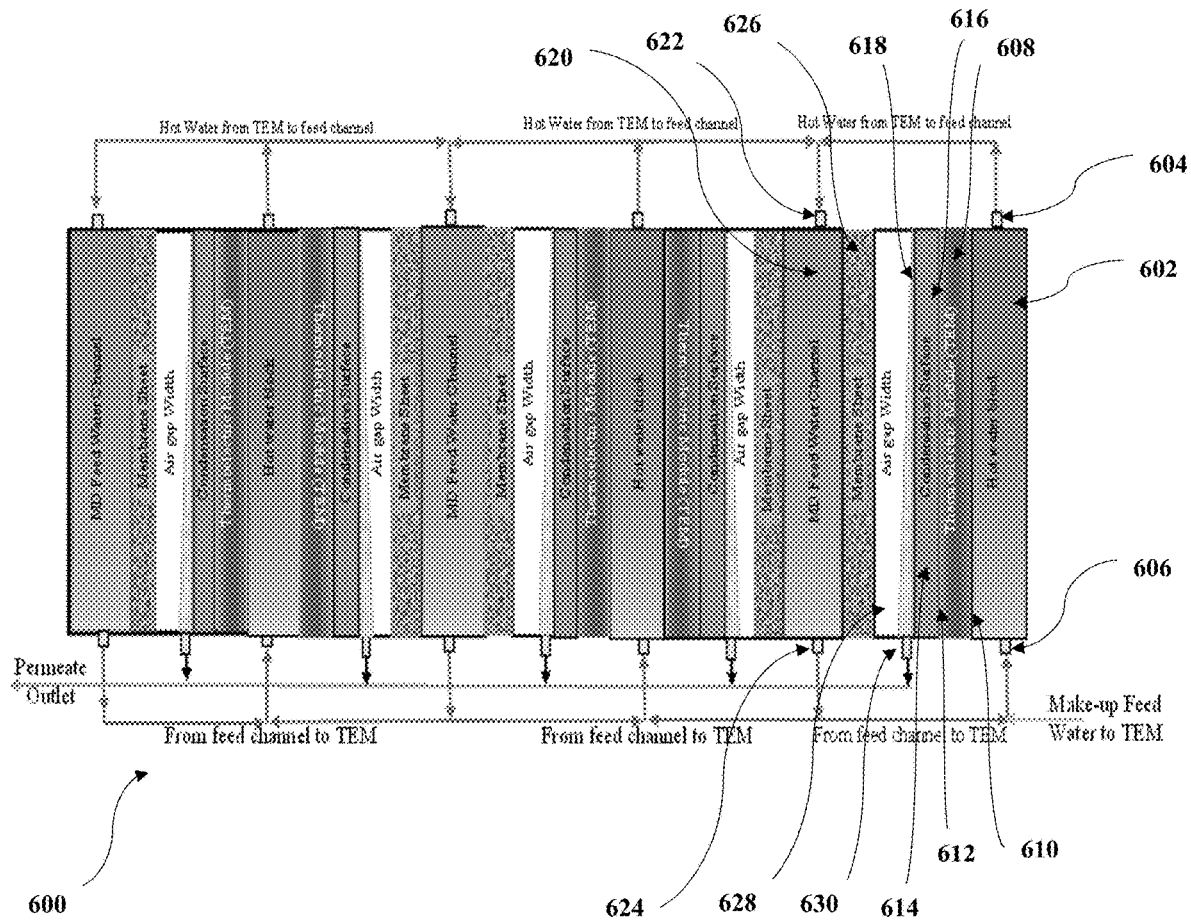
FIG. 6 is a schematic diagram of a multi-stage TEM-AGMD closed-loop apparatus.

FIG. 6 is a schematic diagram of a multi-stage thermoelectric driven air gap membrane distillation (TEM-AGMD) apparatus 600. The apparatus 600 can be an MD module having a configuration selected from a reinforced hollow tube configuration, a non-reinforced hollow tube configuration, a spiral wound configuration, a flat sheet configuration or non-flat configuration. The apparatus 600 includes a housing (not shown) that protects the components of the apparatus 600 from an external atmosphere. In some embodiments, each stage has its own housing. In some embodiments, the entire multi-stage apparatus has an external housing. The apparatus 600 includes a hot liquid block 602 with a hot block inlet 604 and a hot block outlet 606. In FIG. 6, the stream to be treated is fluidly connected in closed loop and is recirculated to the hot liquid block 602 immediately for reheating. The apparatus 600 includes a thermoelectric module 608 (TEM) with a first side 610 and a second side 612 opposite the first side 610. The hot liquid block 602 is adjacent to the first side 610 of the TEM 608. The apparatus 600 includes a condensation surface 614 having a first side 616 and a second side 618 opposite the first side 616. The first side of the condensation surface 616 is adjacent to the second side 612 of the TEM 608. The apparatus 600 includes a feed liquid chamber 620 having a feed chamber inlet 622, a feed chamber outlet 624, and a membrane 626 disposed on at least one side of the feed liquid chamber 620. One side of the membrane 626 faces to the condensation surface 614, for instance in FIG. 6, the right-most surface of the membrane 626 faces the second side 618 of the condensation surface 614. The apparatus 600 includes an air gap 628 in the range of 1 mm to 20 cm, preferably 2 mm to 5 cm, preferably 4-15 mm, preferably 5-12 mm, preferably 6-9 mm, or 7 mm that separates the condensation surface 614 and the membrane 626. The apparatus 600 includes a permeate outlet 630 that is in fluid communication with the air gap 628. In some implementations, the housing comprises a first end and a second end that is opposite the first end. In some implementations, each of the hot liquid block 602, the TEM 608, the condensation surface 114, the feed liquid chamber 120, the membrane 126, and the air gap 128 span from the first end to the second end of a stage housing, which defines a single stage. In some embodiments, there are between 2 and 8 stages, preferably between 3 and 7 stages, preferably between 4 and 6 stages, or 5 stages. In some embodiments, there are more than 8 stages. In some embodiments, there is a membrane 626 between each adjacent stage.

In some embodiments, a first feed liquid chamber 620 in a first stage and a second feed liquid chamber in an adjacent stage are both in fluid communication with a first hot liquid block 602 in the first stage through a first hot block inlet. As shown in FIG. 6 with the arrows towards the bottom, a rightmost first feed liquid chamber in a rightmost first stage and an adjacent second feed liquid chamber in an adjacent second stage each discharge a cool liquid stream through a feed chamber outlet, that merges into one cool liquid stream, to a first cool liquid block in a first stage through a first hot block inlet. In some embodiments, a make-up water stream in the form of a vapor is added to the merged cool liquid stream to make up for liquid losses or transportation losses. In some embodiments, a first hot liquid block 602 in a first stage and a second hot liquid block in an adjacent stage are both in fluid communication with a first feed liquid chamber 620 in the first stage through a first feed chamber inlet 622. As shown in FIG. 6 with the arrows towards the top, a rightmost first hot liquid block 602 in a rightmost first stage and an adjacent second hot liquid block in an adjacent second stage each discharge a hot liquid stream through a hot block outlet, that merges into one hot liquid stream, to a first feed liquid chamber 620 in a first stage through the feed chamber inlet 622. In some embodiments, the permeate outlet discharged from permeate outlet 630 is collected for further use. In some embodiments, the permeate outlet is collected in a tank separate from the apparatus 600. In some embodiments, a make-up feed stream is added to replenish the lost feed stream in the feed liquid chamber 620 in the form of vapor.

Figure 7:
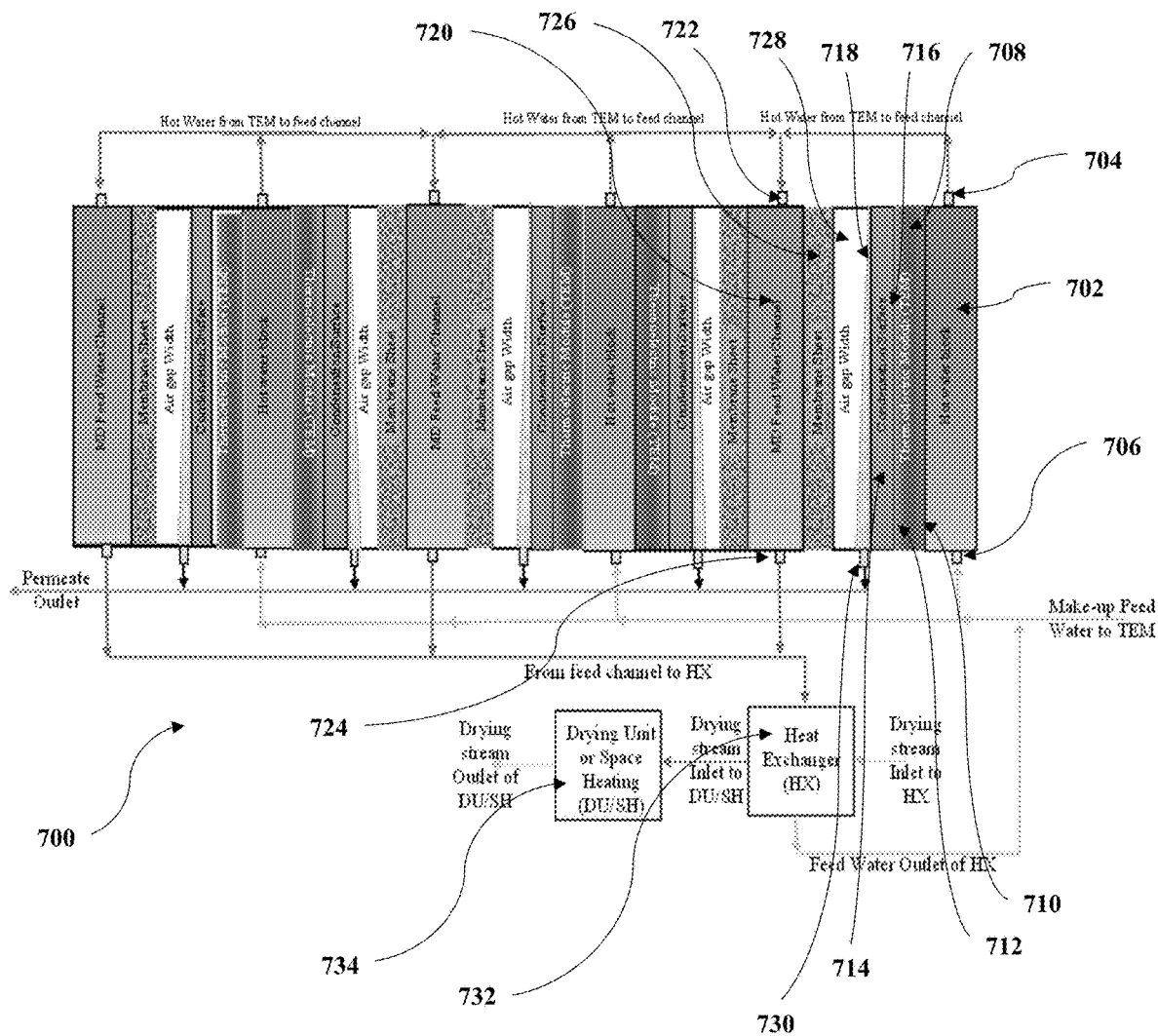
FIG. 7 is a schematic diagram of a multi-stage TEM-AGMD closed/open-loop apparatus with heating application apparatus, according to certain embodiments.

FIG. 7 is a schematic diagram of a multi-stage thermoelectric driven air gap membrane distillation (TEM-AGMD) apparatus 700 with a heating unit. The apparatus 700 can be an MD module having a configuration selected from a reinforced hollow tube configuration, a non-reinforced hollow tube configuration, a spiral wound configuration, a flat sheet configuration or non-flat configuration. The apparatus 700 includes a housing (not shown) that protects the components of the apparatus 700 from an external atmosphere. In some embodiments, each stage has its own housing. In some embodiments, the entire multi-stage apparatus has an external housing. The apparatus 700 includes a hot liquid block 702 with a hot block inlet 704 and a hot block outlet 706. In FIG. 7, the stream to be treated is fluidically connected to the hot liquid block 702 in either a closed or open loop. The apparatus 700 includes a thermoelectric module 708 (TEM) with a first side 710 and a second side 712 opposite the first side 710. The hot liquid block 702 is adjacent to the first side 710 of the TEM 708. The apparatus 700 includes a condensation surface 714 having a first side 716 and a second side 718 opposite the first side 716. The first side of the condensation surface 716 is adjacent to the second side 712 of the TEM 708. The apparatus 700 includes a feed liquid chamber 720 having a feed chamber inlet 722, a feed chamber outlet 724, and a membrane 726 disposed on at least one side of the feed liquid chamber 720. One side of the membrane 726 faces to the condensation surface 714, for instance in FIG. 7, the right-most surface of the membrane 726 faces the second side 718 of the condensation surface 714. The apparatus 700 includes an air gap 728 in the range of 1 mm to 20 cm, preferably 2 mm to 5 cm, preferably 4-15 mm, preferably 5-12 mm, preferably 6-9 mm, or 7 mm that separates the condensation surface 714 and the membrane 726. The apparatus 700 includes a permeate outlet 230 that is in fluid communication with the air gap 728. In some implementations, the housing comprises a first end and a second end that is opposite the first end. In some implementations, each of the hot liquid block 702, the TEM 708, the condensation surface 714, the feed liquid chamber 720, the membrane 726, and the air gap 728 span from the first end to the second end of a stage housing, which defines a stage. The apparatus 700 includes a first heat exchanger 732 and a drying unit (DU) 734, which define a heating unit. The heating unit in fluid communication with the feed liquid chamber 720 and the hot liquid block 702.

In some embodiments, a first feed liquid chamber 720 in a first stage and a second feed liquid chamber in an adjacent stage are both in fluid communication with an inlet of a first heat exchanger 732 through feed chamber outlets. In some embodiments, the cool liquid streams exiting each feed liquid chamber merge in each stage merge into one stream before entering the first heat exchanger 732. As shown in FIG. 7, each feed liquid chamber discharges a cool water stream through the feed chamber outlet to be sent to the first heat exchanger 732 to be reheated. In some embodiments, a first hot liquid block 702 in a first stage and a second hot liquid block in an adjacent stage are both in fluid communication with an outlet of a first heat exchanger through hot block inlets. As shown in FIG. 7, the cool liquid stream sent to the first heat exchanger 732 from the feed liquid chambers is returned to each hot liquid blocks through each respective hot block inlet in their respective stages as a hot liquid stream. In some embodiments, a make-up stream in the form of a vapor is added to the returned hot liquid stream before entering the hot block inlet. As shown in FIG. 7 with the arrows towards the top, a rightmost first hot liquid block 702 in a rightmost first stage and an adjacent second hot liquid block in an adjacent second stage each discharge a hot liquid stream through a hot block outlet, that merges into one hot liquid stream, to a first feed liquid chamber 720 in a first stage through the feed chamber inlet 722. In some embodiments, the drying unit 734 may be embodied as, but not limited to, an electrical heater, a solar heater, resistive heating wires, resistive heating coils, visible or infrared heater or a hot water heat exchanger. In some embodiments, the permeate outlet discharged from each stage is collected for further use. In some embodiments, the permeate outlet is collected in a tank separate from the apparatus 700.

In apparatus 700, the warm liquid feed stream exiting the feed chamber 720 passes through the first heat exchanger 732 where it exchanges heat with stream entering the drying unit or conditioning space 734 before it is recirculated back to the hot liquid block 702 for reheating. A make-up feed stream is added to replenish the lost liquid feed stream in the feed liquid chamber 720 in the form of vapor.

Figure 8:
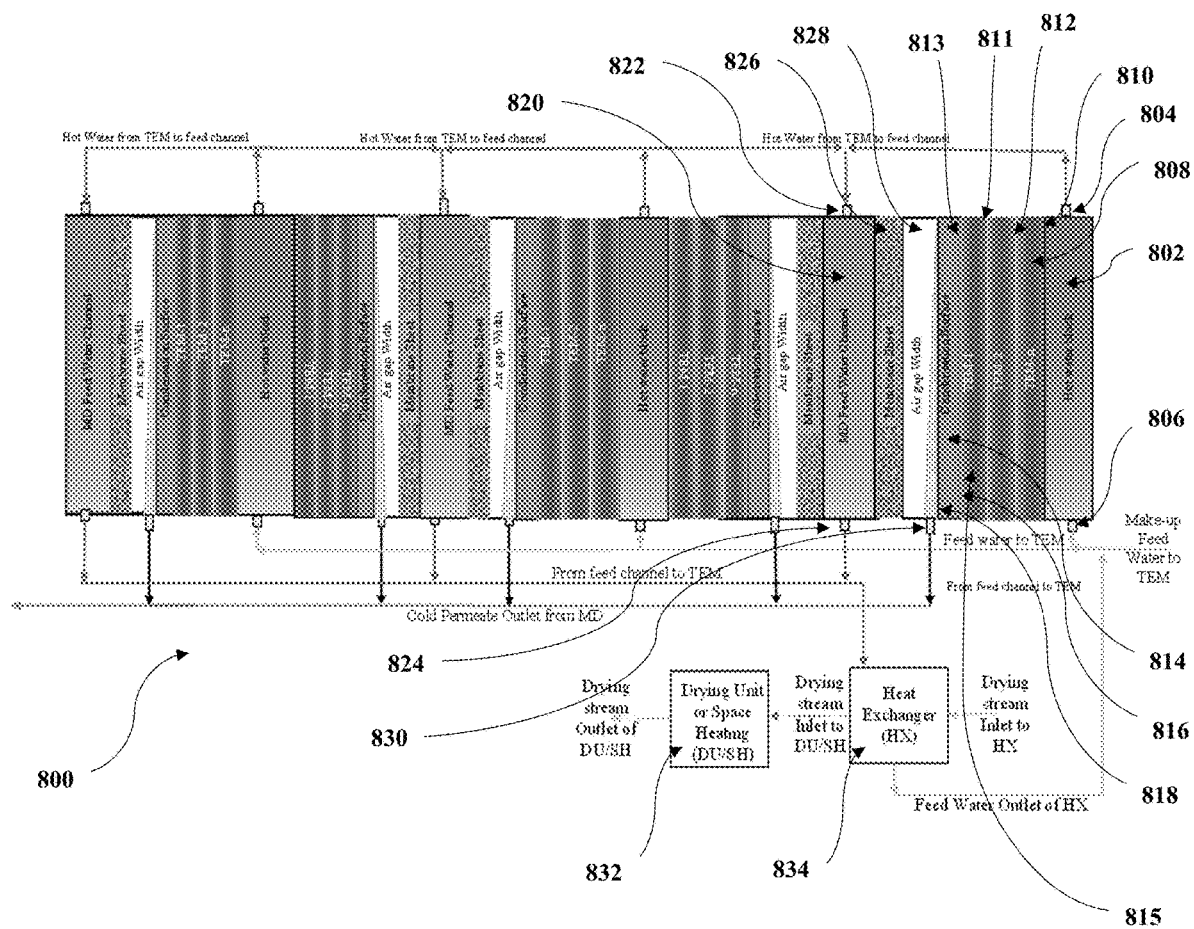
FIG. 8 is a schematic diagram of a multi-stage TEM-AGMD closed/open-loop apparatus with multiple TEMs and a heating application apparatus, according to certain embodiments.

FIG. 8 is a schematic diagram of a multi-stage thermoelectric driven air gap membrane distillation (TEM-AGMD) apparatus 800 with multiple thermoelectric modules (TEM) and a heating application apparatus. The apparatus 800 can be an MD module having a configuration selected from a reinforced hollow tube configuration, a non-reinforced hollow tube configuration, a spiral wound configuration, a flat sheet configuration or non-flat configuration. The apparatus 800 includes a housing (not shown) that protects the components of the apparatus 300 from an external atmosphere. In some embodiments, each stage has its own housing. In some embodiments, the entire multi-stage apparatus has an external housing. The apparatus 800 includes a hot liquid block 802 with a hot block inlet 804 and a hot block outlet 806. In FIG. 8, the stream to be treated is fluidically connected to the hot liquid block 802 in either a closed or open loop. The apparatus 800 includes a first thermoelectric module 808 (TEM) with a first side 810 and a second side 812 opposite the first side 810. The hot liquid block 802 is adjacent to the first side 810 of the first TEM 808. The apparatus 800 includes a second thermoelectric module 815

(TEM) with a first side 811 and a second side 813 opposite the first side 811. The hot liquid block 302 is adjacent to the second side 813 of the second TEM 815. The apparatus 800 includes a condensation surface 814 having a first side 816 and a second side 818 opposite the first side 816. The first side of the condensation surface 816 is adjacent to the second side 813 of the second TEM 815. The apparatus 800 includes a feed liquid chamber 820 having a feed chamber inlet 822, a feed chamber outlet 824, and a membrane 826 disposed on at least one side of the feed liquid chamber 820. One side of the membrane 826 faces to the condensation surface 814, for instance in FIG. 8, the right-most surface of the membrane 826 faces the second side 818 of the condensation surface 814. The apparatus 800 includes an air gap 828 in the range of 1 mm to 20 cm, preferably 2 mm to 5 cm, preferably 4-15 mm, preferably 5-12 mm, preferably 6-9 mm, or 7 mm that separates the condensation surface 814 and the membrane 826. The apparatus 800 includes a permeate outlet 830 that is in fluid communication with the air gap 828. In some implementations, the housing comprises a first end and a second end that is opposite the first end. In some implementations, each of the hot liquid block 802, the TEM 808, the condensation surface 814, the feed liquid chamber 820, the membrane 826, and the air gap 828 span from the first end to the second end of the stage housing, which defines a stage. The apparatus 800 includes a first heat exchanger 832 and a drying unit (DU) 834, which define a heating unit. The heating unit in fluid communication with the feed liquid chamber 820 and the hot liquid block 802. In some embodiments, there are between 2 and 8 stages, preferably between 3 and 7 stages, preferably between 4 and 6 stages, or 5 stages. In some embodiments, there are more than 8 stages. In some embodiments, there is a membrane 826 between each adjacent stage.

In some embodiments, a plurality of thermoelectric modules (TEMs) each having a first side and a second side opposite the first side, wherein and the hot liquid block 802 of a first stage is adjacent to a first side 810 of the first TEM 808 and the second side 818 of the condensation surface 814 of a first stage is adjacent to a second side 813 of a second TEM 815 of the first stage. In some embodiments, a first feed liquid chamber 820 in a first stage and a second feed liquid chamber in an adjacent stage are both in fluid communication with an inlet of a first heat exchanger 832 through feed chamber outlets. In some embodiments, the cool liquid streams exiting each feed liquid chamber merge in each stage merge into one stream before entering the first heat exchanger 832. As shown in FIG. 8, each feed liquid chamber discharges a cool liquid stream through the feed chamber outlet to be sent to the first heat exchanger 832 to be reheated. In some embodiments, a first hot liquid block 802 in a first stage and a second hot liquid block in an adjacent stage are both in fluid communication with an outlet of a first heat exchanger through hot block inlets. As shown in FIG. 8, the cool liquid stream sent to the first heat exchanger 832 from the feed liquid chambers is returned to each hot liquid blocks through each respective hot block inlet in their respective stages as a hot liquid stream. In some embodiments, a make-up stream in the form of a vapor is added to the returned hot liquid stream before entering the hot block inlet. As shown in FIG. 8 with the arrows towards the top, a rightmost first hot liquid block 802 in a rightmost first stage and an adjacent second hot liquid block in an adjacent second stage each discharge a hot liquid stream through a hot block outlet, that merges into one hot liquid stream, to a first feed liquid chamber 820 in a first stage through the feed chamber inlet 822. In some embodiments, the drying unit 834 may be embodied as, but not limited to, an electrical heater, a solar heater, resistive heating wires, resistive heating coils, visible or infrared heater or a hot water heat exchanger. In some embodiments, the permeate outlet discharged from each stage is collected for further use. In some embodiments, the permeate outlet is collected in a tank separate from the apparatus 800.

In apparatus 800, warm liquid feed stream exiting the feed liquid chamber 820 passes through the first heat exchanger 832 where it exchanges heat with a stream entering the drying unit or conditioning space 834 before it is recirculated back to the hot liquid block 802 for reheating. A make-up feed stream is added to replenish the lost liquid feed stream in the feed liquid chamber 820 in the form of vapor.

Figure 9:
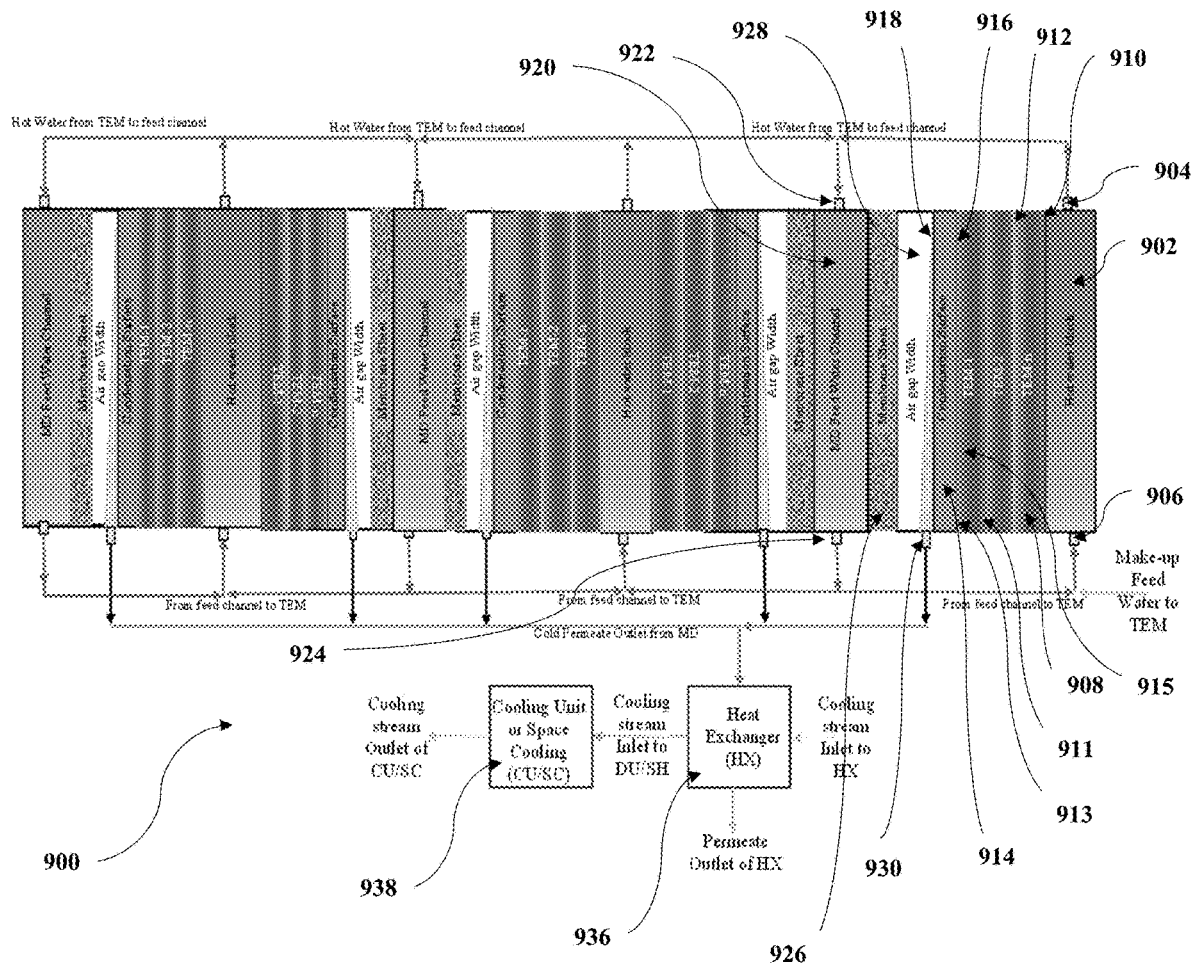
FIG. 9 is a schematic diagram of a multi-stage TEM-AGMD closed-loop apparatus with multiple TEMs and a cooling application apparatus, according to certain embodiments.

FIG. 9 is a schematic diagram of a single stage thermoelectric driven air gap membrane distillation (TEM-AGMD) apparatus 900 with multiple thermoelectric modules (TEM) and a cooling application apparatus. The apparatus 900 can be an MD module having a configuration selected from a reinforced hollow tube configuration, a non-reinforced hollow tube configuration, a spiral wound configuration, a flat sheet configuration or non-flat configuration. The apparatus 900 includes a housing (not shown) that protects the components of the apparatus 900 from an external atmosphere. In some embodiments, each stage has its own housing. In some embodiments, the entire multi-stage apparatus has an external housing. The apparatus 900 includes a hot liquid block 902 with a hot block inlet 904 and a hot block outlet 906. In FIG. 9, the stream to be treated is fluidly connected in closed loop and is recirculated to the hot liquid block 902 immediately for reheating. The apparatus 900 includes a first thermoelectric module 908 (TEM) with a first side 910 and a second side 912 opposite the first side 910. The hot liquid block 902 is adjacent to the first side 910 of the first TEM 908. The apparatus 900 includes a second thermoelectric module 915 (TEM) with a first side 911 and a second side 913 opposite the first side 911. The hot liquid block 902 is adjacent to the second side 913 of the second TEM 915. The apparatus 900 includes a condensation surface 914 having a first side 916 and a second side 918 opposite the first side 916. The first side of the condensation surface 916 is adjacent to the second side 913 of the second TEM 915. The apparatus 900 includes a feed liquid chamber 920 having a feed chamber inlet 922, a feed chamber outlet 924, and a membrane 926 disposed on at least one side of the feed liquid chamber 920. One side of the membrane 926 faces to the condensation surface 914, for instance in FIG. 9, the right-most surface of the membrane 426 faces the second side 918 of the condensation surface 914. The apparatus 900 includes an air gap 928 in the range of 1 mm to 20 cm, preferably 2 mm to 5 cm, preferably 4-15 mm, preferably 5-12 mm, preferably 6-9 mm, or 7 mm that separates the condensation surface 914 and the membrane 926. The apparatus 900 includes a permeate outlet 930 that is in fluid communication with the air gap 928. In some implementations, the housing comprises a first end and a second end that is opposite the first end. In some implementations, each of the hot liquid block 902, the TEM 908, the condensation surface 914, the feed liquid chamber 920, the membrane 926, and the air gap 928 span from the first end to the second end of the stage housing, which defines the stage. The apparatus 900 includes a second heat exchanger 936 and a space cooler 938, which define the cooling unit. In some embodiments, there are between 2 and 8 stages, preferably between 3 and 7 stages, preferably between 4 and 6 stages, or 5 stages. In some embodiments, there are more than 8 stages. In some embodiments, there is a membrane 926 between each adjacent stage.

In some embodiments, a first air gap 928 in a first stage and a second air gap in an adjacent stage are both in fluid communication with an inlet of a second heat exchanger 936 through air gap outlets. As seen in FIG. 9, each air gap discharges a distilled liquid stream through the permeate outlet to be sent to the second heat exchanger 936 to be heated to a desired temperature before further use. As shown in FIG. 9, a rightmost first feed liquid chamber 920 in a rightmost first stage and an adjacent feed liquid chamber in an adjacent second stage each discharge a cool liquid stream through a feed chamber outlet, that merges into one cool liquid stream, to a first hot liquid block in a first stage through a first feed chamber inlet. In some embodiments, a water make-up stream is added to the merged cool liquid stream before entering the first feed chamber inlet. As shown in FIG. 9 with the arrows towards the top, a rightmost first hot liquid block 902 in a rightmost first stage and an adjacent second hot liquid block in an adjacent second stage each discharge a hot liquid stream through a hot block outlet, that merges into one hot liquid stream, to a first feed liquid chamber 920 in a first stage through the feed chamber inlet 922. In some embodiments, the space cooler 938 may be embodied as, but not limited to, an electrical cooler, a solar cooler, resistive cooling wires, resistive cooling coils, visible or infrared cooler or a cold-water heat exchanger.

The cold permeate stream exiting the air gap 928 passes through the second heat exchanger 936 where it exchanges heat with stream entering the cooling unit or conditioning space 938. A make-up feed stream is added to replenish the lost feed stream in the feed liquid chamber 920 in the form of vapor.

Figure 10:
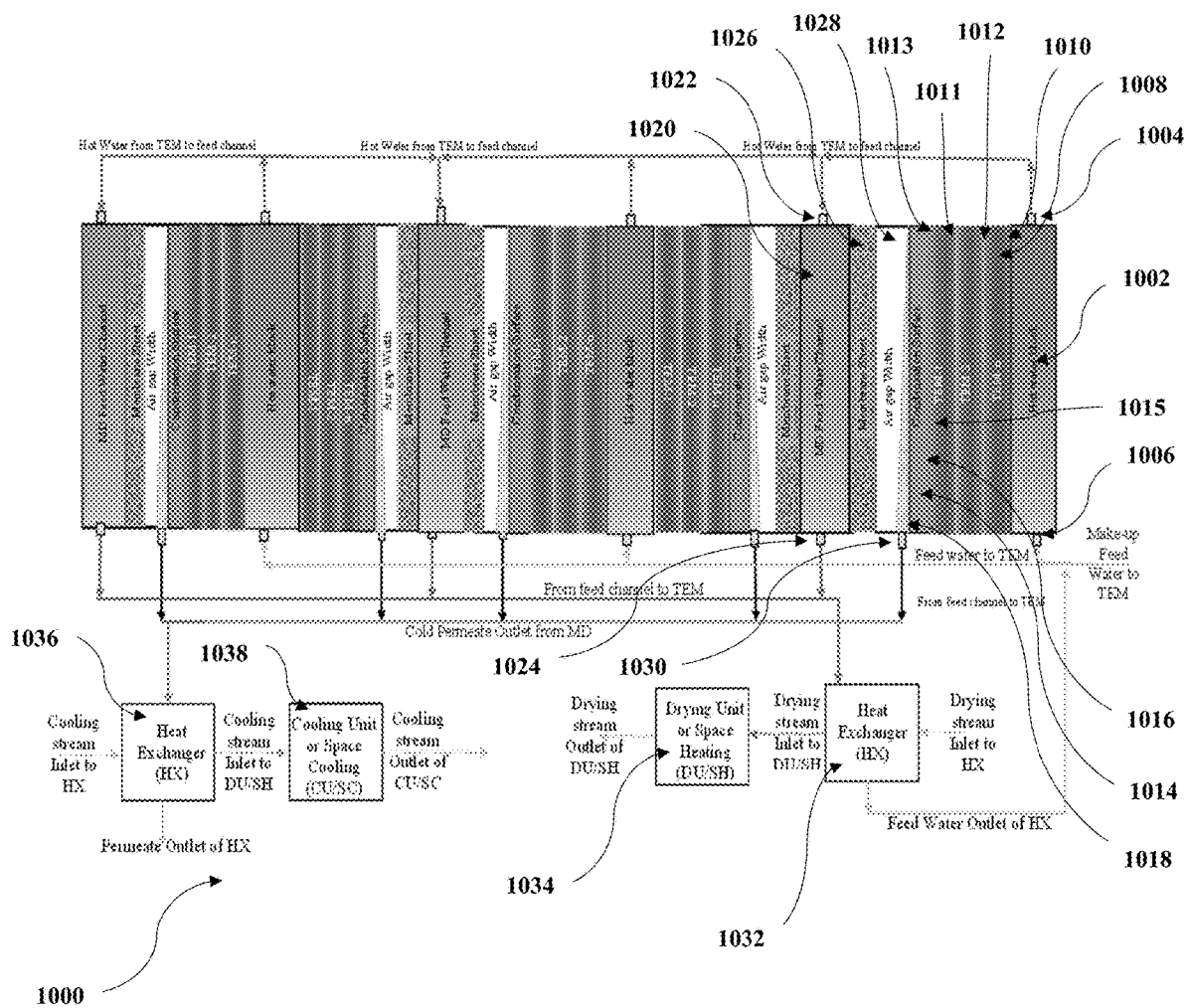
FIG. 10 is a schematic diagram of a multi-stage TEM-AGMD closed/open-loop apparatus with multiple TEMs for a cooling and a heating application apparatus, according to certain embodiments.

FIG. 10 is a schematic diagram of a multi-stage thermoelectric driven air gap membrane distillation (TEM-AGMD) apparatus 1000 with multiple thermoelectric modules (TEM), a heating application apparatus, and a cooling application apparatus. The apparatus 1000 can be an MD module having a configuration selected from a reinforced hollow tube configuration, a non-reinforced hollow tube configuration, a spiral wound configuration, a flat sheet configuration or non-flat configuration. The apparatus 1000 includes a housing (not shown) that protects the components of the apparatus 1000 from an external atmosphere. In some embodiments, each stage has its own housing. In some embodiments, the entire multi-stage apparatus has an external housing. The apparatus 1000 includes a hot liquid block 1002 with a hot block inlet 1006 and a hot block outlet 1004. In FIG. 10, the stream to be treated is fluidically connected to the hot liquid block 1002 in either a closed or open loop. The apparatus 1000 includes a first thermoelectric module 1008 (TEM) with a first side 1010 and a second side 1012 opposite the first side 1010. The hot liquid block 1002 is adjacent to the first side 1010 of the first TEM 1008. The apparatus 1000 includes a second thermoelectric module 1015 (TEM) with a first side 1011 and a second side 1013 opposite the first side 1011. The hot liquid block 1002 is adjacent to the second side 1013 of the second TEM 1015. The apparatus 1000 includes a condensation surface 1014 having a first side 1016 and a second side 1018 opposite the first side 1016. The first side of the condensation surface 1016 is adjacent to the second side 1013 of the second TEM 1015. The apparatus 1000 includes a feed liquid chamber 1020 having a feed chamber inlet 1022, a feed chamber outlet 1024, and a membrane 1026 disposed on at least one side of the feed liquid chamber 1020. One side of the membrane 1026 faces to the condensation surface 1014, for instance in FIG. 10, the right-most surface of the membrane 1026 faces the second side 1018 of the condensation surface 1014. The apparatus 1000 includes an air gap 1028 in the range of 1 mm to 20 cm, preferably 2 mm to 5 cm, preferably 4-15 mm, preferably 5-12 mm, preferably 6-9 mm, or 7 mm that separates the condensation surface 1014 and the membrane 1026. The apparatus 1000 includes a permeate outlet 1030 that is in fluid communication with the air gap 1028. In some implementations, the housing comprises a first end and a second end that is opposite the first end. In some implementations, each of the hot liquid block 1002, the TEM 1008, the condensation surface 1014, the feed liquid chamber 1020, the membrane 1026, and the air gap 1028 span from the first end to the second end of the stage housing, which defines the stage. The apparatus 1000 includes a first heat exchanger 1032 and a drying unit (DU) 1034, which define a heating unit. The heating unit in fluid communication with the feed liquid chamber 1020 and the hot liquid block 1002. The apparatus 1000 includes a second heat exchanger 1036 and a space cooler 1038, which define the cooling unit. In some embodiments, there are between 2 and 8 stages, preferably between 3 and 7 stages, preferably between 4 and 6 stages, or 5 stages. In some embodiments, there are more than 8 stages. In some embodiments, there is a membrane 1026 between each adjacent stage.

In some embodiments, a first feed liquid chamber in a first stage and a second feed liquid chamber in an adjacent stage are both in fluid communication with an inlet of a first heat exchanger through feed chamber outlets. As seen in FIG. 10, outlets from the feed liquid chambers in their respective chambers merge into one stream before entering the first heat exchanger 1032. The stream is then returned as a heated stream to respective hot liquid blocks through their hot block inlets. In some embodiments, a make-up stream is added to the returned stream. In some embodiments, a first air gap in a first stage and a second air gap in an adjacent stage are both in fluid communication with an inlet of a second heat exchanger through air gap outlets. As seen in FIG. 10, the permeate outlets from respective air gaps in their respective stages merge into one stream to be sent to the second heat exchanger 1036 for cooling before further use. As shown in FIG. 10, a rightmost first feed liquid chamber 1020 in a rightmost first stage and an adjacent feed liquid chamber in an adjacent second stage each discharge a cool liquid stream through a feed chamber outlet, that merges into one cool liquid stream, to a first hot liquid block in a first stage through a first feed chamber inlet. In some embodiments, the drying unit 1034 may be embodied as, but not limited to, an electrical heater, a solar heater, resistive heating wires, resistive heating coils, visible or infrared heater or a hot water heat exchanger. In some embodiments, the space cooler 1038 may be embodied as, but not limited to, an electrical cooler, a solar cooler, resistive cooling wires, resistive cooling coils, visible or infrared cooler or a coldwater heat exchanger.

The warm feed stream exiting the feed liquid chamber 1020 passes through the first heat exchanger 1032 where it exchanges heat with the stream entering the drying unit or conditioning space 1034 before it is recirculated back to the hot liquid block 1002 for reheating. Whereas the cold permeate stream exiting the air gap 1028 passes through the second heat exchanger 1036 where it exchanges heat with stream entering the cooling unit or conditioning space 1038. A make-up feed stream is added to replenish the lost feed stream in the feed liquid chamber 1020 in the form of vapor.

Figure 11:
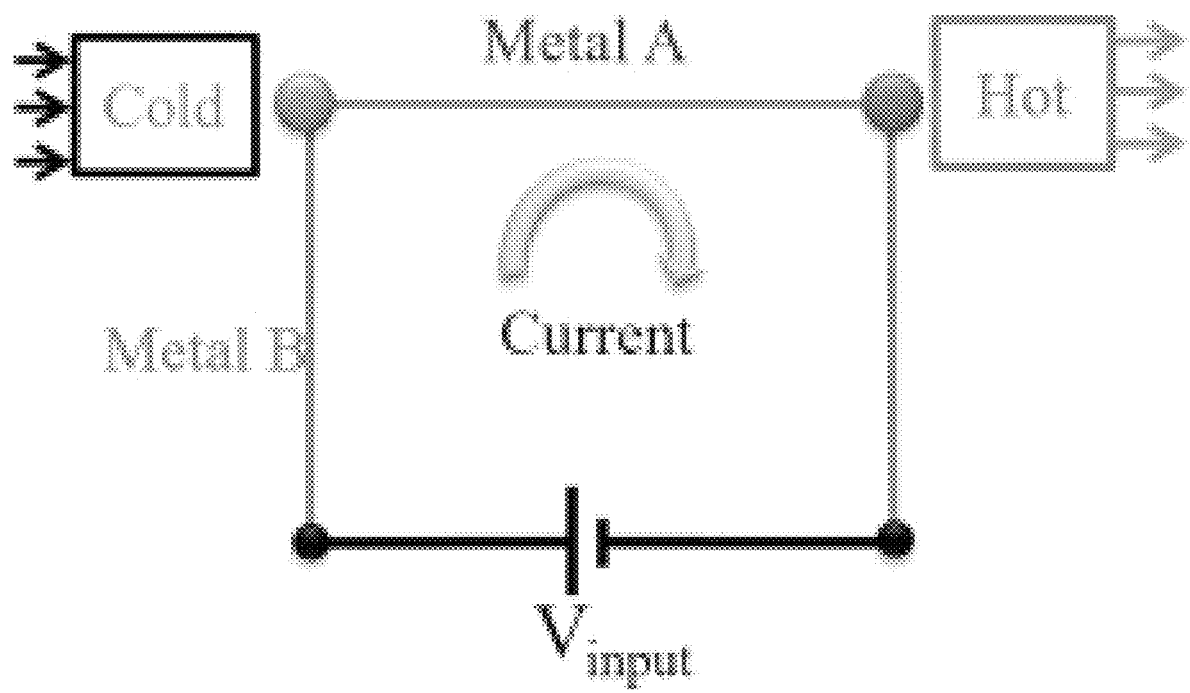
FIG. 11 is a schematic diagram of a thermoelectric cooling or heating based on the Peltier effect in the TEM, according to certain embodiments.
Figures 12A, 12B:
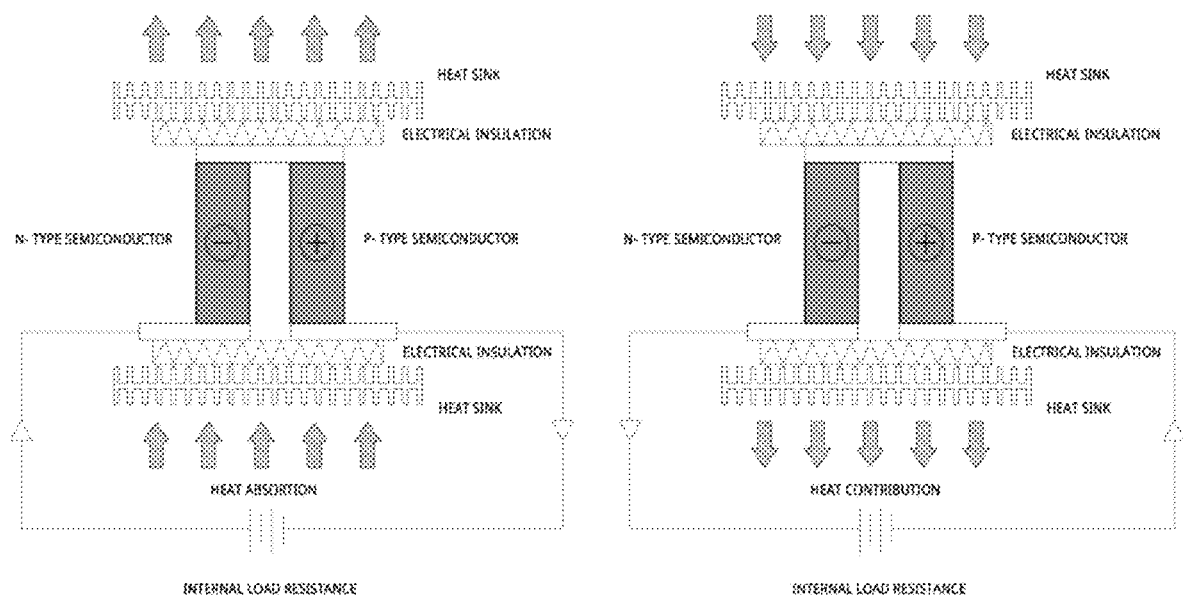
FIG. 12A is a schematic diagram of a thermoelectric heat absorption in the TEM, according to certain embodiments.
FIG. 12B is a schematic diagram of a thermoelectric heat contribution in the TEM, according to certain embodiments.
Figure 13:
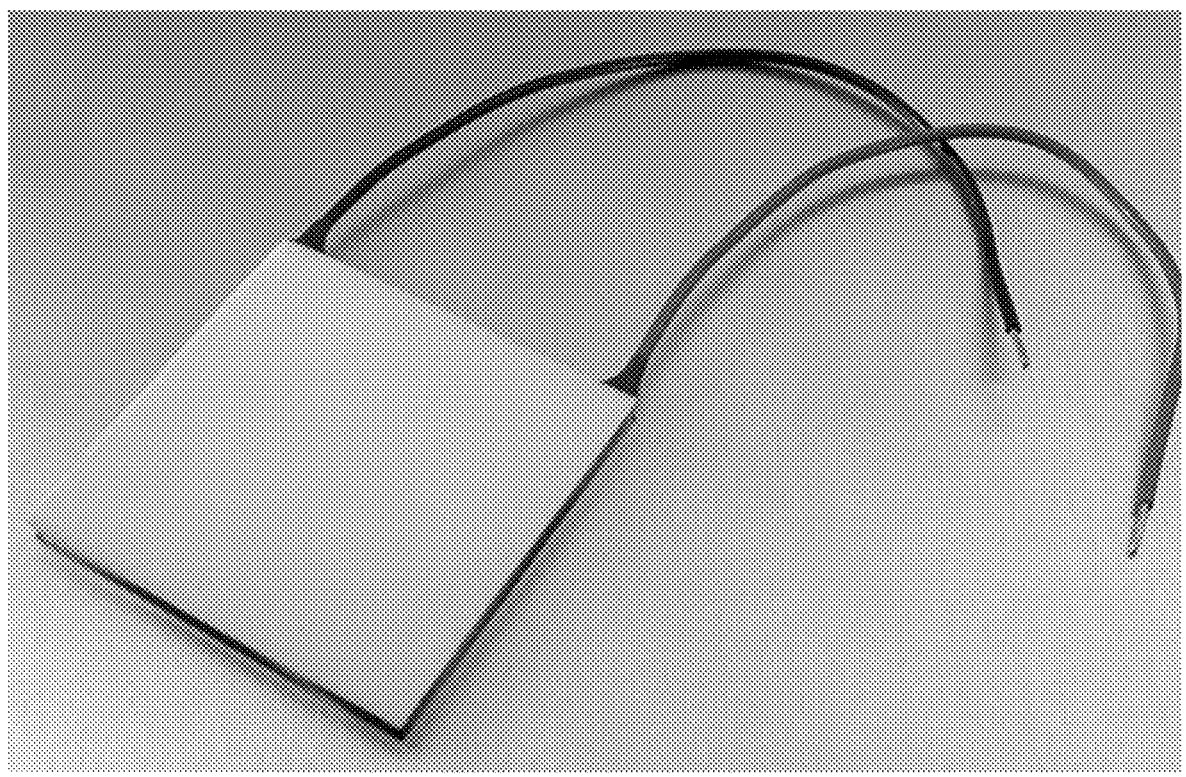
FIG. 13 is an illustration of a thermoelectric cooler module, according to certain embodiments.

FIG. 11 is a schematic diagram showing the working principle of thermoelectric cooling/heating based on the Peltier effect. In some embodiments, TEM is applied to transform electrical energy into thermal energy (by the Peltier effect). The Peltier effect is produced when electric current flows through two different types of semiconductor metals, as shown in FIG. 11. The Peltier effect is described as a temperature difference that can be produced in a circuit of two different electrical conductors by the applied current flow (FIG. 11). In some embodiments, a current starts the heat transfer from one side to the other, while one side is getting cooler the other starts to heat up. If the direction of the current is changed, the heat transfer direction changes, too, hence Peltier cells can be used as heat pumps which can simultaneously provide heating and cooling. FIGS. 12A and 12B depict the Peltier effect explained for both current directions. In FIG. 12A, heat is absorbed from lower part of the TEM and released into upper part of the TEM to heat the TEM. In FIG. 12B, heat is released from lower part of the TEM and absorbed into upper part of the TEM to cool the TEM. FIG. 13 is an illustration of a thermoelectric cooler module with two types of semiconductor metals and respective anode and cathode for effective electrical energy to thermal energy conversion.

Figure 14A:
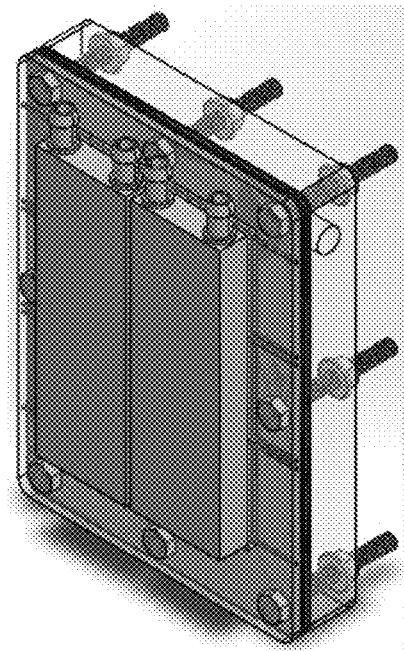
FIG. 14A is an illustration of a single-stage TEM module, according to certain embodiments.
Figure 14B:
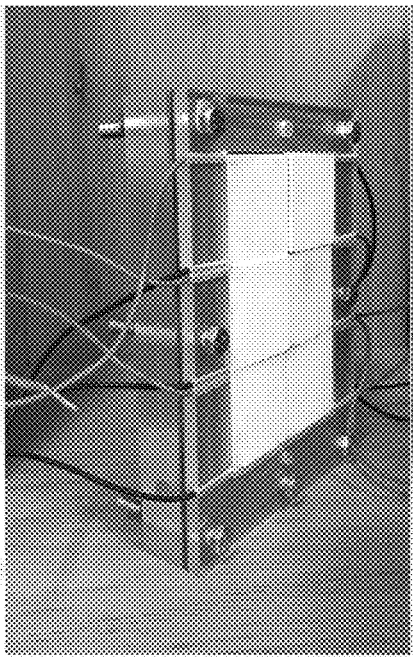
FIG. 14B is an illustrative front view of a single-stage TEM module, according to certain embodiments.
Figure 14C:
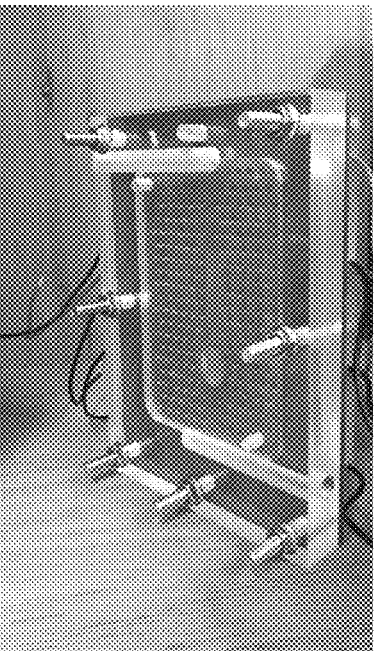
FIG. 14C is an illustrative back view of a single-stage TEM module, according to certain embodiments.

FIG. 14A an illustration of a single-stage TEM module. Further, FIG. 14A shows the condensation surface being drilled together to the TEM. FIG. 14B an illustrative front view of a single-stage TEM module. Six thermoelectric modules with 50 watts of power were used as heat pump for supplying heating and cooling to the feed water and condensation surface, respectively. The thermoelectric modules were powered by solar photovoltaic (PV) system consisting of a 150 W solar panel, a 12V-20A solar charge controller and a 12V-26AH battery. The feed stream salts concentration was 50000 mg/L (50000 ppm) and the feed water flowrate was fixed at 0.85 L/min. FIG. 14C an illustrative back view of a single-stage TEM module, depicting the air gap and condensation surface with respect to the TEM.

Figure 15:
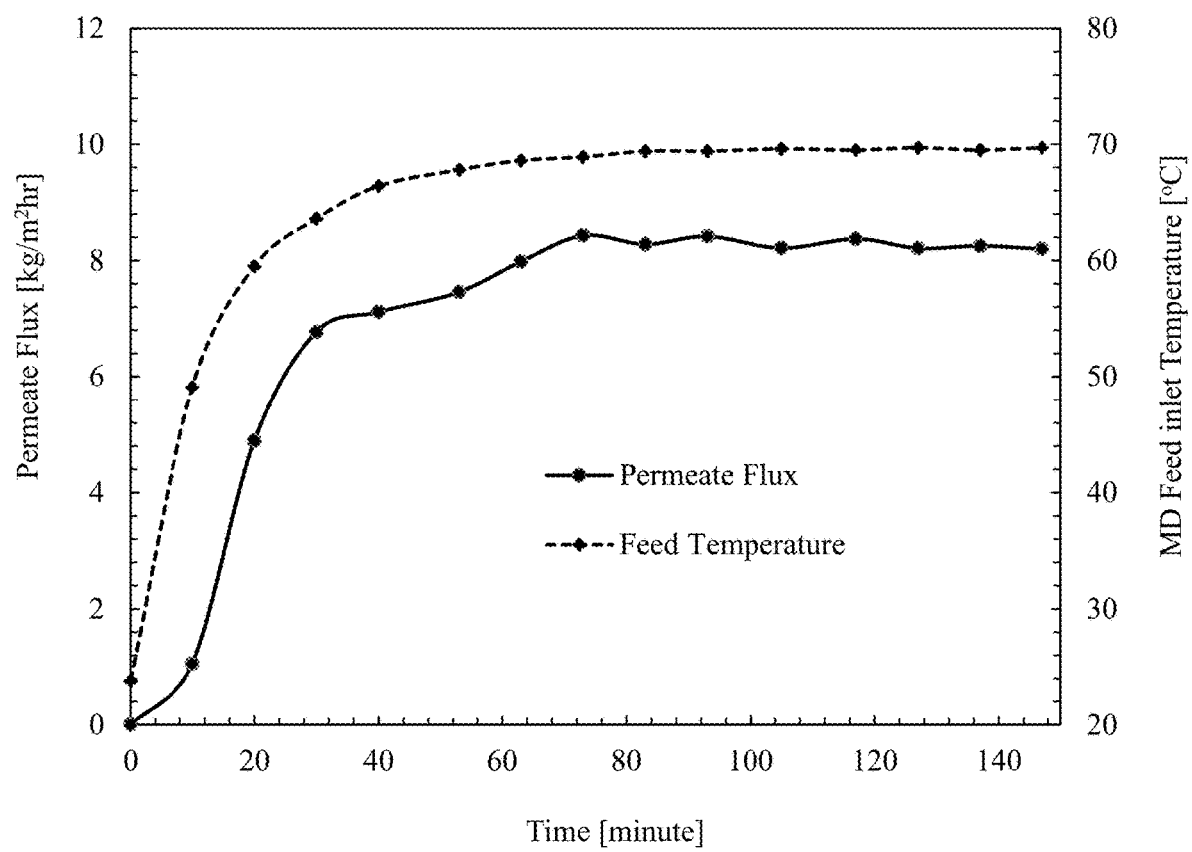
FIG. 15 is a graph of a permeate flux and membrane inlet feed water temperature against time.

FIG. 15 is a graph of a permeate flux and membrane inlet feed water temperature against time. FIG. 15 demonstrates the permeate flux across the flat sheet PTFE membrane for a single stage TEM-AGMD system in accordance with an embodiment of this invention. The feed water temperature varies between 23.8° C. and 69.7° C. during the tested duration. For the tested duration, the permeate flux ranges between 1.06 kg/m²hr to 8.20 kg/m²hr, while the specific energy consumption varied between 638 kWh/m³ to 1350 kWh/m³. It should be noted that the recorded salt rejection efficiency was above 99% throughout the duration of the test.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An air gap distillation system, comprising:
a hot liquid block having a hot block inlet and a hot block outlet;
a thermoelectric module (TEM) having a first side and a second side opposite the first side, wherein the hot liquid block is adjacent to the first side of the TEM;
a condensation surface having a first side and a second side opposite the first side, wherein the first side of the condensation surface is adjacent to the second side of the TEM;
a feed liquid chamber having a feed chamber inlet, a feed chamber outlet, and a membrane disposed on at least one side of the feed liquid chamber;
wherein one side of the membrane faces to the condensation surface;
an air gap of 1-200 mm separates the condensation surface and the membrane;
a permeate outlet in fluid communication with the air gap;
a heating unit in fluid communication with the feed liquid chamber and the hot liquid block; and
a cooling unit in fluid communication with the permeate outlet,
wherein the heating unit comprises a first heat exchanger, and a space heating unit (SH), a space heating inlet to SH, and a space heating outlet of SH, wherein the first heat exchanger is selected from the group consisting of a plate heat exchanger, a shell and tube heat exchanger, a plate and shell heat exchanger, and a plate fin heat exchanger;
wherein the first heat exchanger is fluidly connected to the feed liquid chamber through the feed chamber outlet; and
wherein the first heat exchanger is fluidly connected the hot liquid block through the hot block inlet.

2. The distillation apparatus of claim 1, wherein the cooling unit comprises a second heat exchanger, and at least one module selected from the group consisting of a cooling unit (CU) and a space cooling unit, wherein the CU comprises a cooling unit inlet and a cooling unit outlet, and wherein the SC comprises a space cooling inlet and a space cooling outlet;
wherein the second heat exchanger is fluidly connected to the permeate outlet.

3. The distillation apparatus of claim 1, wherein the apparatus further comprises a first TEM and second TEM each having a first side and a second side opposite the first side, wherein the first side of the first TEM is adjacent to the hot liquid block and the second side of the second TEM is adjacent to the condensation surface.

4. The distillation apparatus of claim 1, wherein the membrane is a polytetrafluoroethylene flat sheet.

5. The distillation apparatus of claim 4, wherein the polytetrafluoroethylene flat sheet has a mean pore size between 0.1 μm and 10 μm.

6. The distillation apparatus of claim 1, wherein the air gap includes a rubber support to separate the second side of the condensation surface and the membrane.

7. The distillation apparatus of claim 2, wherein the second heat exchanger is at least one selected from the group consisting of plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

8. A multi-stage distillation apparatus comprising a plurality of the distillation apparatuses according to claim 1.

9. The multi-stage distillation apparatus of claim 8, wherein a first feed liquid chamber in a first stage and a second feed liquid chamber in an adjacent stage are both in fluid communication with a first hot liquid block in the first stage through a first hot block inlet.

10. The multi-stage distillation apparatus of claim 8, wherein a first hot liquid block in a first stage and a second hot liquid block in an adjacent stage are both in fluid communication with a first feed liquid chamber in the first stage through a first feed chamber inlet.

11. The multi-stage distillation apparatus of claim 8, wherein a first feed liquid chamber in a first stage and a second feed liquid chamber in an adjacent stage are both in fluid communication with an inlet of a first heat exchanger through feed chamber outlets.

12. The multi-stage distillation apparatus of claim 8, wherein a first hot liquid block in a first stage and a second hot liquid block in an adjacent stage are both in fluid communication with an outlet of a first heat exchanger through hot block inlets.

13. The multi-stage distillation apparatus of claim 8, wherein the apparatus further comprises a plurality of thermoelectric modules (TEMs) each having a first side and a second side opposite the first side, wherein and a hot liquid block of a first stage is adjacent to a first side of the first TEM and the second side of the condensation surface of the first stage is adjacent to a second side of a second TEM of the first stage.

14. The multi-stage distillation apparatus of claim 8, wherein a first air gap in a first stage and a second air gap in an adjacent stage are both in fluid communication with an inlet of a second heat exchanger through air gap outlets.

15. The multi-stage distillation apparatus of claim 8, wherein a first feed liquid chamber in a first stage and a second feed liquid chamber in an adjacent stage are both in fluid communication with an inlet of a first heat exchanger through feed chamber outlets; and
a first air gap in a first stage and a second air gap in an adjacent stage are both in fluid communication with an inlet of a second heat exchanger through air gap outlets.

16. The multi-stage distillation apparatus of claim 8, wherein the TEM is powered by at least one source selected from the group consisting of solar photovoltaic module, wind power mill, geothermal power, and ocean/wave mill.

17. A process of distilling water, comprising:
feeding a liquid into the distillation apparatus of claim 1 through the hot block inlet and collecting distilled water from the permeate outlet.

18. The process of distilling water of claim 17, wherein the liquid is at least one selected from the group consisting of salty water, ocean/sea water, rejected brine, wastewater, brackish water, flowback/produced water, fruit juices, blood, milk, dyes, and waste flows.

* * * * *